US007401292B2

(12) United States Patent
Kurashina

(10) Patent No.: US 7,401,292 B2
(45) Date of Patent: Jul. 15, 2008

(54) CHARACTER-INFORMATION PROCESSING METHOD, CHARACTER-INFORMATION PROCESSING APPARATUS, PROGRAM, AND STORAGE MEDIUM

(75) Inventor: Hiroyasu Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 619 days.

(21) Appl. No.: 11/137,212

(22) Filed: May 24, 2005

(65) Prior Publication Data

US 2006/0017943 A1 Jan. 26, 2006

(30) Foreign Application Priority Data

Jul. 20, 2004 (JP) ............................. 2004-211787

(51) Int. Cl.
*G06F 17/00* (2006.01)

(52) U.S. Cl. .................................... 715/256; 400/109.1

(58) Field of Classification Search ................. 715/256; 358/1.1; 400/109.1
See application file for complete search history.

(56) References Cited

U.S. PATENT DOCUMENTS 5,795,156 A * 8/1998 Redford et al. ............. 434/118
7,112,000 B2 * 9/2006 Kurashina et al. ......... 400/109.1
7,179,001 B2 * 2/2007 Akaiwa .................... 400/109.1
7,241,062 B2 * 7/2007 Takada et al. ............ 400/109.1
7,290,951 B2 * 11/2007 Tanaka et al. ............ 400/109.1
2005/0238403 A1 * 10/2005 Kurashina et al. ......... 400/109.1
2005/0238404 A1 * 10/2005 Kurashina et al. ......... 400/109.1
2005/0281599 A1 * 12/2005 Akaiwa ....................... 400/76
2006/0001913 A1 * 1/2006 Akaiwa et al. ............. 358/3.29
2006/0193669 A1 * 8/2006 Takada et al. ............ 400/109.1
2006/0222429 A1 * 10/2006 Kurashina ..................... 400/76
2006/0228144 A1 * 10/2006 Akaiwa .................... 400/109.1
2006/0228145 A1 * 10/2006 Takada et al. ............ 400/109.1

FOREIGN PATENT DOCUMENTS

JP 10-275206 10/1998
JP 2006-001131 A 1/2006
JP 2003-182158 A 7/2006

OTHER PUBLICATIONS

Lee et al., Designing a Universal Keyboard Using Chording Gloves, ACM 2003, pp. 142-147.*
King, Text and Braille Translation, Google Sep. 2001, pp. 1-106.*
Japanese Language office action dated Oct. 17, 2006 lists the references above.

* cited by examiner

*Primary Examiner*—Cong-Lac Huynh
(74) *Attorney, Agent, or Firm*—Hogan & Hartson LLP

(57) ABSTRACT

In a character-information processing method, a candidate alternative having relative positional information including at least the front-and-rear relation of ink-characters and braille, which are printed and embossed, respectively, on the same sheet, is stored as one of those alternatives for setting margins capable of being set as margins of the Braille. When the candidate alternative is selected from among those alternatives for margins, the ink characters and the braille are arranged based on the relative positional information.

7 Claims, 14 Drawing Sheets

FIRST PROCESS MODE: INK-CHARACTERS PRINTING→BRAILLE EMBOSSING

SECOND PROCESS MODE: INK-CHARACTERS PRINTING ONLY

THIRD PROCESS MODE: BRAILLE EMBOSSING ONLY

T1: 24 MM TAPE WIDTH

T2: 18 MM TAPE WIDTH

T3: 12 MM TAPE WIDTH

FIG. 12

| PHASES | FIRST PHASE | SECOND PHASE | THIRD PHASE | REFERENCES |
|---|---|---|---|---|
| TITLES | BRAILLE SETTING | SELECTED IN FIRST PHASE | SELECTED IN SECOND PHASE | |
| ALTERNATIVES | __BRAILLE MARGIN | __SPECIFY LENGTH | __0.5cm<br>__1.0cm<br>__1.5cm<br>__2.0cm<br>⋮<br>__5.0cm | EXAMPLE 1 |
| | | __RELATIVE SPECIFICATION | __MINIMUM<br>__SMALL<br>__NORMAL<br>__AUTOMATIC<br>__LARGE | EXAMPLE 2 |
| | | __BEHIND INK CHARACTERS | __−5.0cm<br>⋮<br>__−1.0cm<br>__−0.5cm<br>__ 0.0cm<br>__+0.5cm<br>__+1.0cm<br>⋮<br>__+5.0cm | EXAMPLE 4<br>EXAMPLE 3 |
| | | __IN FRONT OF INK CHARACTERS | __−5.0cm<br>⋮<br>__−1.0cm<br>__−0.5cm<br>__ 0.0cm<br>__+0.5cm<br>__+1.0cm<br>⋮<br>__+5.0cm | EXAMPLE 6<br>EXAMPLE 5 |

CHARACTER-INFORMATION PROCESSING METHOD, CHARACTER-INFORMATION PROCESSING APPARATUS, PROGRAM, AND STORAGE MEDIUM

BACKGROUND OF THE INVENTION

1. Field of the Invention

The present invention relates to a character-information processing method, a character-information processing apparatus, a program, and a storage medium, for printing ink characters and embossing braille on the same sheet.

2. Description of the Related Art

A known braille label is of a type in which braille recognizable by visually-impaired people and ink characters (representing general printing characters as opposed to braille) recognizable by visually-normal people are arranged side by side or overlapped with each other with an equal spacing on the same sheet (tape) in such a way that they are recognizable by both visually-impaired and visually-normal people.

When a braille label of this type is formed, front-and-rear margins are set either in common for or separately for ink characters and braille. Thus, in the former, it is not possible to establish a desired relative positional relation between ink characters and braille by a margin setting. As a result, it is known in the latter case also that there occur nonconformities including an unbalanced arrangement of ink characters and braille, an erroneous overlapping of ink characters and braille in part or in whole, illegibility of ink characters, and deformation of ink characters attributable to the existence of braille.

SUMMARY OF THE INVENTION

With respect to the above, it is an advantage of the present invention to provide a character-information processing method, a character-information processing apparatus, a program, and a storage medium, which can easily establish a desired relative positional relation between ink characters to be printed and braille to be embossed on the same sheet by a margin setting.

According to one aspect of the present invention, there is provided a character-information processing method, comprising: storing a candidate alternative having relative positional information including at least a front-and-rear relation of ink-characters and braille, which are printed and embossed, respectively, on the same sheet, as one of those alternatives for setting margins capable of being set as margins of the Braille; and arranging, when the candidate alternative is selected from among those alternatives for margins, the ink characters and the braille based on the relative positional information.

According to another aspect of the present invention, there is provided a character-information processing apparatus for printing ink characters and embossing braille on the same sheet, comprising: a storage means for storing a candidate alternative having relative positional information including at least the front-and-rear relation of the ink characters and the braille on the sheet as one of those alternatives for setting margins capable of being set as margins of the braille; a selection means for selecting the candidate alternative from among those alternatives for setting margins as a margin to be set; and an arrangement means for arranging the ink characters and the braille based on the relative positional information when the candidate alternative is selected.

With the character-information processing method and the character-information processing apparatus, when the candidate alternative indicating a relative positional relation between the ink characters and the braille is selected as an alternative for setting margins, the ink characters and the braille are arranged in accordance with the relative positional relation. Namely, the ink characters and the braille can easily be arranged only by selecting the candidate alternative. With provision of various candidate alternatives, a desired relative positional relation between ink characters and braille can easily be established by a margin setting. Note that the above-described "relative positional information including the front-and-rear relation" refers not only to one type of relative positional information aimed at the front-and-rear relation where the ink characters and the braille are aligned with each other, but also to another type of relative positional information aimed at a vertical or an oblique relation where the ink characters and the braille are arranged over a plurality of lines or partially overlapped with each other in a manner shifting to the vertical direction. It is sufficient enough in these case only if the relative positional information indicates the front-and-rear relation in terms of the front-and-rear direction.

In the character-information processing method, it is preferable that the relative positional information includes, in addition to information on the front-and-rear relation, information on an interval between the ink characters and the braille in the front-and-rear direction thereof.

With the character-information processing method, the relative positional information on the candidate alternatives includes not only the front-and-rear relation but also information of the interval in the front-and-rear direction. Accordingly, the ink characters and the braille having a desired front-and-rear relation and the interval can easily be arranged. The relative positional relation based on the arrangement can easily be established by a margin setting.

In the character-information processing method, it is preferable that a plurality of types of candidate alternatives are specified, the interval is specified as a standard of zero in a state where the ink characters and the braille are sequentially arranged in the front-and-rear direction, and the plurality of types of candidate alternatives include those indicating negative values of the interval.

With the character-information processing method, negative values of the interval in the front-and-rear direction can be selected and specified when one of the plurality of candidate alternatives is selected. Accordingly, a relative positional relation, in which the ink characters and the braille are overlapped with each other by a distance of the negative values, can easily be established by a margin setting.

In the character-information processing method in which the relative positional information includes information on the interval, it is preferable that the front or rear end of the ink characters including the margins set for printing the ink characters is a standard of the interval.

With the character-information processing method, since the front or rear end of the ink characters including the margins set for printing the ink characters is the standard of the interval, either front or rear margin already set can be used without any change because it is easier to see ink characters when ink-characters printing is solely performed. Alternatively, the front or rear end of an actual printing area excluding the front and rear margins may be used as the standard. This is preferable regardless of the existing setting when a new setting is made in consideration only of the positional relation between the ink characters (printing area) and braille (embossing area) actually appearing on a face. Therefore, either of the above may be used.

According to still another aspect of the present invention, there are provided a program capable of implementing the character-information processing method as defined in the above or performing the character-information processing apparatus, and a storage medium storing the program as defined in the above in such a way that it is readable by a device capable of processing the program.

The program is capable of implementing the character-information processing methods as defined in the above or performing the character-information processing apparatus. Accordingly, after the program is processed by the device capable of processing the same, or the program stored in the storage medium is read out and implemented by the device capable of processing the same, a desired relative positional relation between ink characters and braille can easily be established by a margin setting.

BRIEF DESCRIPTION OF THE DRAWINGS

The above and other objects and the attendant features of the present invention will become readily apparent by reference to the following detailed description when considered in conjunction with the accompanying drawings wherein:

FIG. 12 is a diagram for illustrating, as an example, alternatives in respective phases for specifying braille margins;

DETAILED DESCRIPTION OF THE PREFERRED EMBODIMENTS

Hereinafter, a description will be made specifically about a label forming apparatus (character-information processing apparatus) according to one embodiment of the present invention, with reference to the accompanying drawings.

Figure 1:
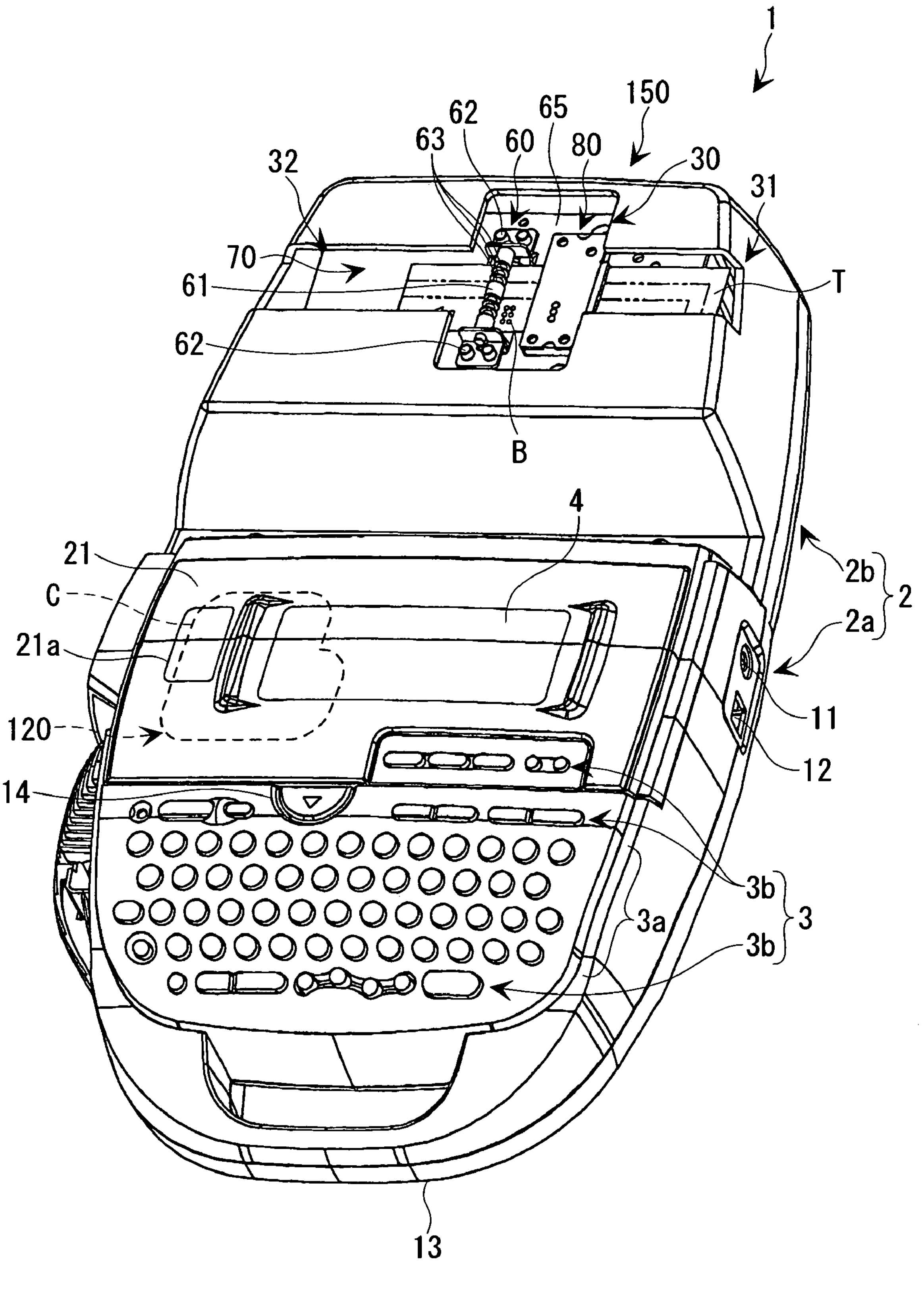
FIG. 1 is an external perspective view of a label forming apparatus according to an embodiment.
Figure 2:
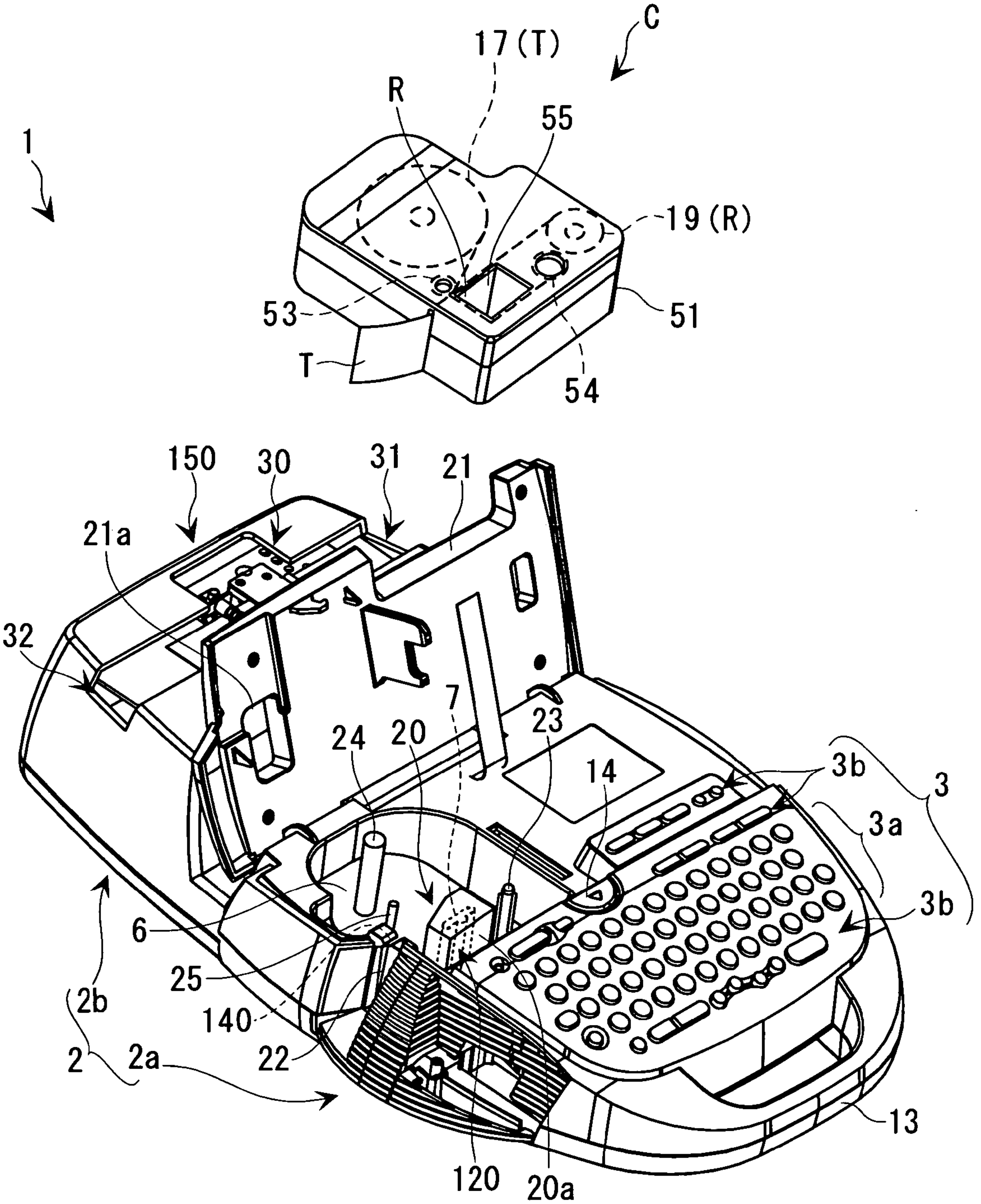
FIG. 2 is an external perspective view of the label forming apparatus of FIG. 1 with its cover open.

As shown in FIGS. 1 and 2, the label forming apparatus 1 has an outer shape formed by an apparatus casing 2 having a handle 13, and the casing 2 is integrally formed by a front casing 2*a* and a rear casing 2*b*. The front casing 2*a* has an ink-characters printing section 120, which performs ink-characters printing on a tape (sheet) T reeled out from a tape cartridge C. The rear casing 2*b* has a braille embossing section 150, which performs braille embossing on the tape T manually fed by the user after ink-characters printing.

The front casing 2*a* has a front top face where a keyboard 3 provided with various input keys is arranged, and has a rear top face to which an opening/closing cover 21 is attached. The opening/closing cover 21 has a rectangular display 4 therein. Inside the opening/closing cover 21, there is provided a recessed cartridge mounting section 6 (ink-characters printing section 120) for mounting the tape cartridge C on the left side thereof. The tape cartridge C is detachably mounted in the cartridge mounting section 6, with the opening/closing cover 21 being opened by pressing a cover opening button 14. In addition, the opening/closing cover 21 has an discrimination window 21*a* therein for discriminating the mounting/non-mounting of the tape cartridge C in its closed state.

On the right side of the front casing 2*a*, there are formed a power source supplying port 11 for supplying power source, and a connecting port 12 (interface) for connecting with external devices (not shown) such as a personal computer. When the external devices are connected to the connecting port 12, it is made possible to print ink characters or emboss braille based on character information generated by the external devices. Further, on the left side of the front casing 2*a*, there is formed a printing-tape ejecting port 22 for communicating the cartridge mounting section 6 with the outside. At the printing-tape ejecting port 22, a tape cutter 142 is arranged for cutting off the tape T fed out from the ink-characters printing section 120. The tape T printed with ink characters is ejected from the printing-tape ejecting port 22 with its rear end cut off by a cutting section 140.

Figure 3:
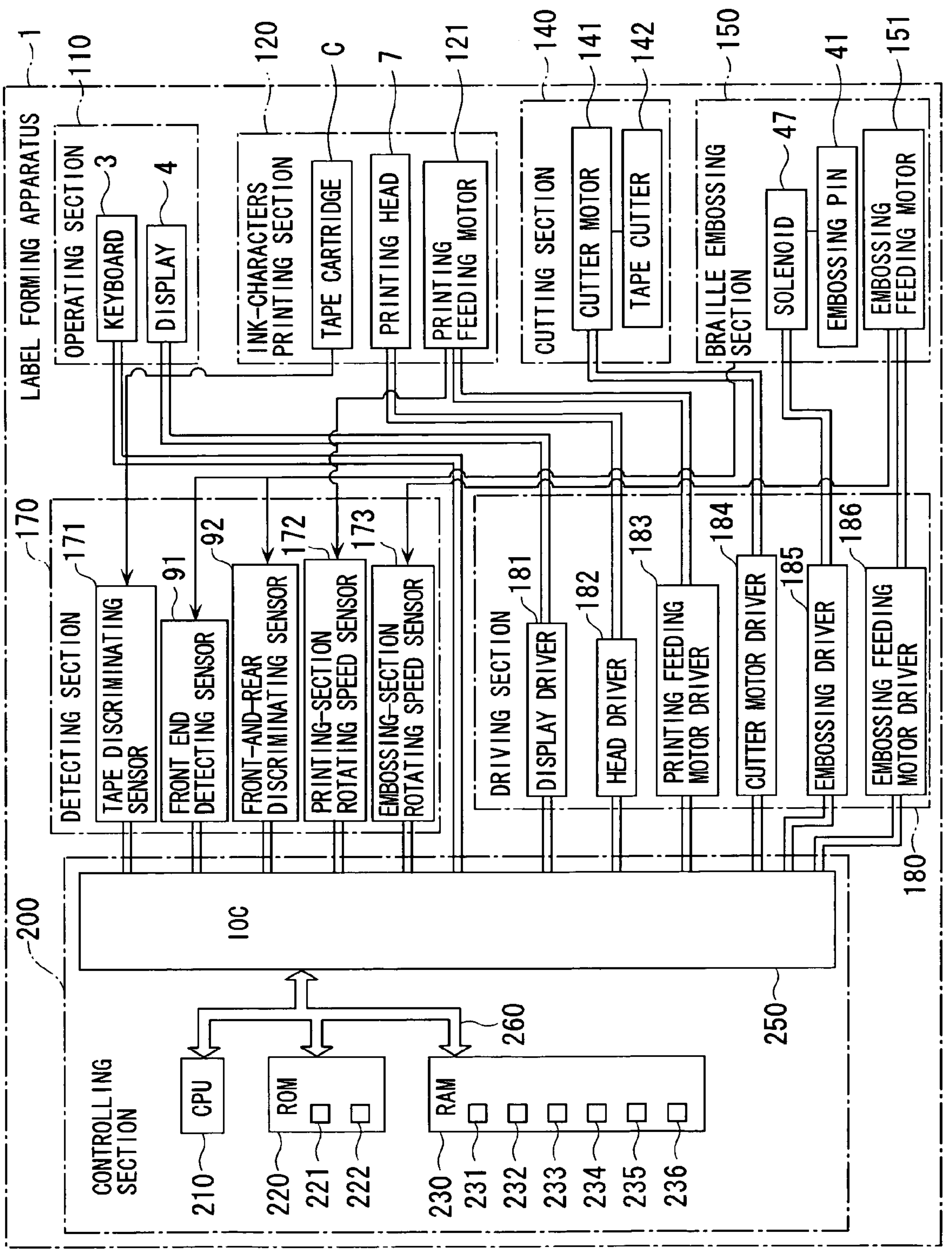
FIG. 3 is a schematic block diagram of the label forming apparatus of FIG. 1 as viewed from its control system.

The label forming apparatus 1, as shown in FIG. 3, is composed of an operating section 110, an ink-characters printing section 120, and a cutting section 140 in its basic configuration. The operating section 110 has the keyboard 3 and the display 4, and serves as a man-machine interface for allowing the user to input character information or display various information. The ink-characters printing section 120 has the tape cartridge C, a printing head 7, and a printing feeding motor 121, and prints on the tape T ink-characters while feeding the tape T and an ink ribbon R. The cutting section 140 has the tape cutter 142 and a cutter motor 141 for driving it, and cuts off the tape T printed with ink characters.

The label forming apparatus 1 is further composed of a braille embossing section 150 and a detecting section 170. The braille embossing section 150 has solenoids 47, embossing pins 41, and an embossing feeding motor 151, and embosses braille on the tape T while feeding the same. The detecting section 170 has: tape discriminating sensors 171 for detecting the type of the tape T (tape cartridge C); a front end detecting sensor 91 for detecting the front end of the tape T in the braille embossing section 150; a front-and-rear discriminating sensor 92 for discriminating front-and-rear discriminating information D, which is printed on the tape T in the braille embossing section 150; a printing-section rotating speed sensor 172 for detecting the rotating speed of the printing feeding motor 121; and an embossing-section rotating speed sensor 173 for detecting the rotating speed of the embossing feeding motor 151. With such sensors, the detecting section 170 performs various detections.

The label forming apparatus 1 is furthermore composed of a driving section 180 and a controlling section 200. The driving section 180 has a display driver 181, a head driver 182, a printing feeding motor driver 183, a cutter motor driver 184, an embossing driver 185, and an embossing feeding motor driver 186. With such drivers, the driving section 180 drives each of the sections. The controlling section 200 is connected to each of the sections, and controls the label forming apparatus 1 as a whole.

The controlling section 200 has a CPU 210, a ROM 220, a RAM 230, and an input/output controller (hereinafter referred to as IOC) 250, all of which are connected to one another through an internal bus 260. The ROM 220 has a control program block 221 and a control data block 222. The control program block 221 stores therein control programs for controlling various processes including ink-characters printing or braille embossing with the CPU 210. The control data block 222 stores therein data for printing in ink front-and-rear discriminating information D, control data for controlling the embossing of braille data, etc., in addition to character font data for ink-characters printing and braille font data for braille embossing. Note that the character font data may be stored in a CG-ROM (character generation ROM), rather than in the ROM 220.

The RAM 230 has, in addition to various work area blocks 231 used as a flag, etc., an ink-characters printing data block 232 for storing generated ink-characters printing data; a braille embossing data block 233 for storing generated braille embossing data; a display data block 234 for storing display data displayed on the display 4; a layout block 235 for storing the layout of a set ink-characters printing region (printing arrangement area) Ep and a braille embossing region (embossing arrangement area) Eb; an inverted braille data block 236 for storing inverted braille data B' (see FIGS. 9A to 9C) used in a case where braille data is embossed in an inverted state in accordance with the selected layout. In other words, the RAM 230 is used as a work area for control processes. Further, the RAM 230 is always battery-protected for holding stored data in case of power-off.

The IOC 250 has a logic circuit incorporated therein for complementing functions of the CPU 210 and handling interface signals with various peripheral circuits through a gate array and a custom LSI. Thereby, the IOC 250 receives into the internal bus 260 input data or control data through the keyboard 3 or various sensor values detected by the detecting section 170 either with or without processing the same. In addition, the IOC 250 outputs to the driving section 180 data or control signals outputted to the internal bus 260 from the CPU 210 either with or without processing the same while interlocking the CPU 210.

With the above configuration, the CPU 210 inputs various signals/data from each section of the label forming apparatus 1 through the IOC 250 in accordance with the control programs of the ROM 220. Further, the CPU 210 processes various data of the RAM 230 based on the inputted various signals/data, and outputs the various signals/data to each section of the label forming apparatus 1 through the IOC 250, thereby controlling the processes of ink-characters printing and braille embossing.

Figure 9A:
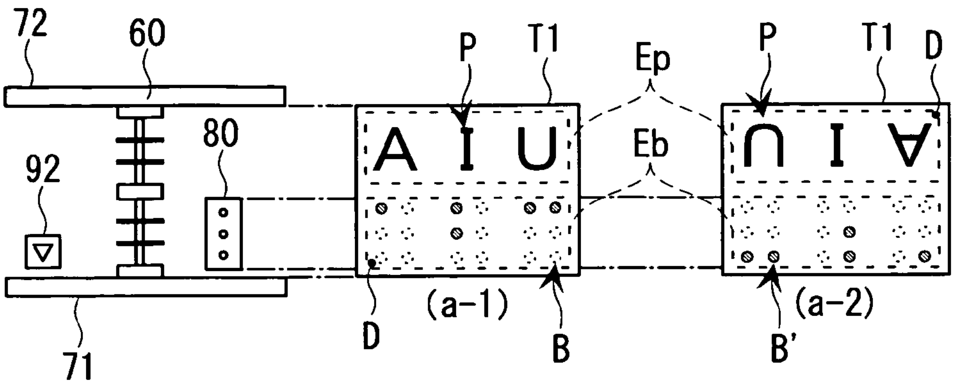
FIGS. 9A to 9C are illustrations for supplementally explaining a difference in the tape width of FIG. 7.
Figure 9B:
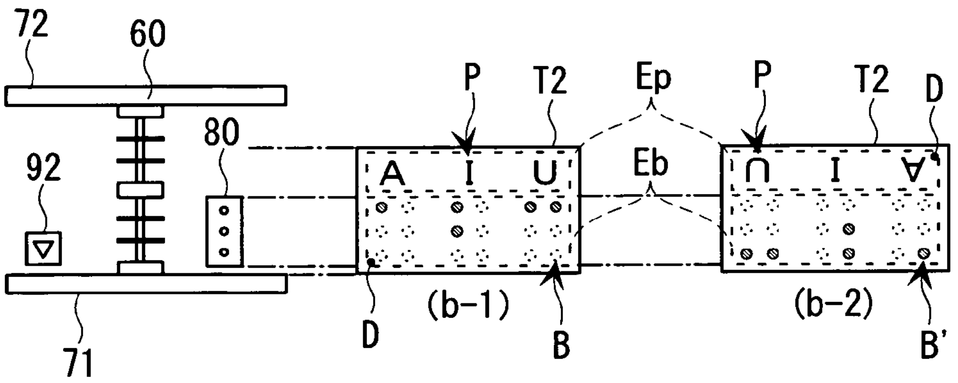
Figure 9C:
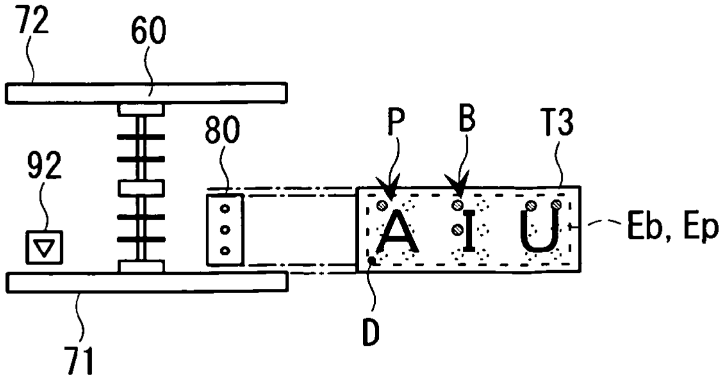

For example, when character information is inputted by the user through the keyboard 3, the CPU 210 generates ink-characters printing data P and braille embossing data B based on the character information, and adjusts, as required, the length or the like between them to prepare inverted braille data B' (see FIGS. 9A to 9C). Further, the CPU 210 stores the ink-characters printing data (including margin data) P in the ink-characters printing data block 232 before or after it is subjected to the dimensional adjustment. In addition, the CPU 210 stores the braille embossing data (including margin data) B in the braille embossing data block 233 before or after it is subjected to the dimensional adjustment. Moreover, the CPU 210 stores the inverted braille data B' in the inverted braille data block 236.

When it receives ink characters and braille embossing commands from the keyboard 3, the CPU 210 causes the printing feeding motor 121 to start and the printing head 7 to operate in response to a detection result by the printing-section rotating speed sensor 172, thereby performing ink-characters printing based on the ink-characters printing data P, and printing front-and-rear discriminating information D of the tape T to be inserted, based on the data previously stored in the control data block 222. Thereafter, the CPU 210 causes the tape to be fed at a given distance based on the ink-characters printing data after dimensional adjustment of the data as required. The tape T is then ejected from the printing-tape ejecting port 22 with its rear end cut off by the tape cutter 142.

As shown in FIGS. 1 to 3, subsequently (in a state where no reset operation or power-off operation is made), when the user manually feeds the tape T cut into a strip into the embossing-tape inserting port 31, the CPU 210 brings an embossing unit 80 and a tape feeding mechanism 60 into action, thereby performing braille embossing based on the braille embossing data B or the inverted braille data B'. When the embossing is completed, the CPU 210 brings the embossing feeding motor 151 into action, thereby feeding the tape at a given distance based on the braille embossing data B, etc. The tape T is then ejected from the embossing-tape ejecting port 32. Note that the embossing unit 80 may manually start embossing when the user presses an embossing start key on the keyboard 3, rather than triggering the detection of the front end of the tape by using the front end detecting sensor 91.

Figure 4A:
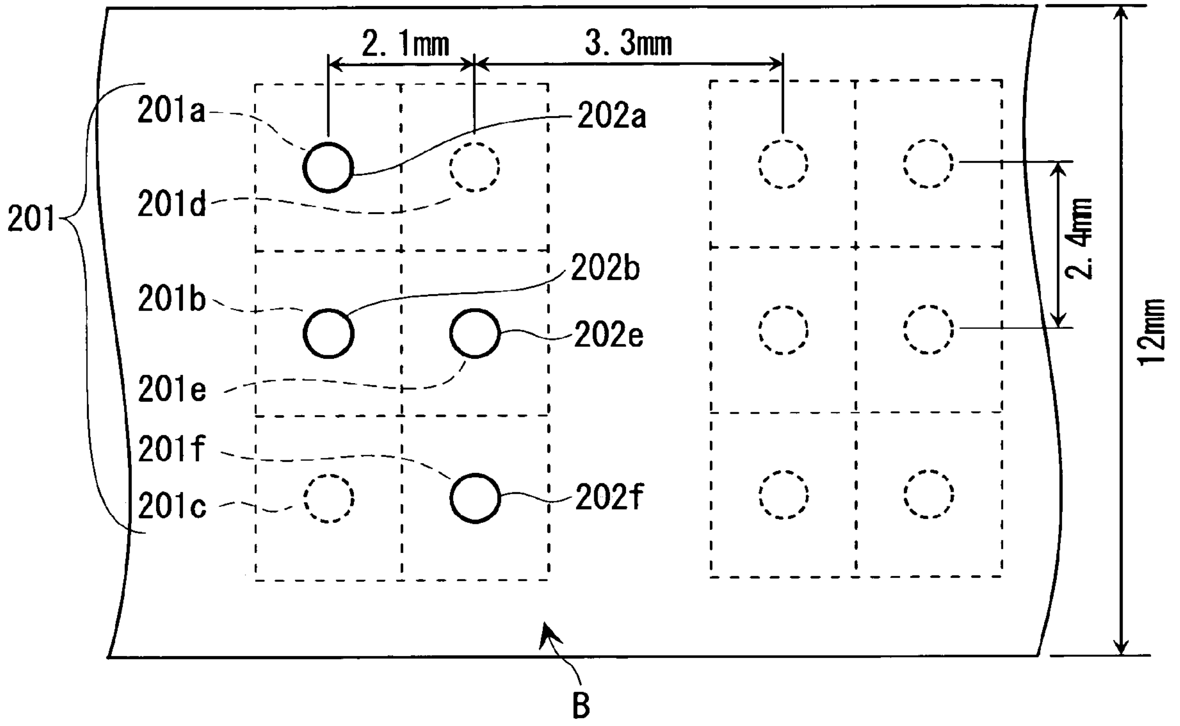
FIGS. 4A and 4B are illustrations of a 6-point (3×2) embossing of braille and a cross section of an embossing convex portion.
Figure 4B:
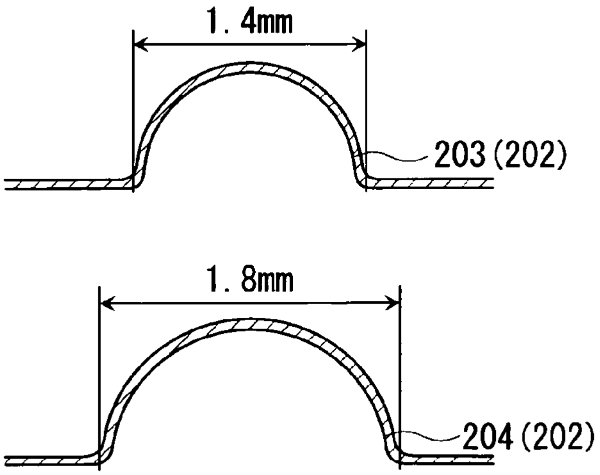

A description will now be made about braille B (six-point braille B), which is to be formed on the tape T, with reference to FIGS. 4A and 4B.

According to a specification (hereinafter referred to as a de facto standard) of a character (one square) and a character spacing (between squares), which is used commonly with a brailler and a braille typewriter, as shown in the figures, the six-point braille B forms one square 201 constituted of six points (embossing points: six points from the so-called "a first point" to "a sixth point"), which in turn are constituted of three dots in length×two dots in width. The one square 201 represents a character, a voice sound symbol, etc. with an arrangement pattern of embossing points and non-embossing points. FIG. 4A, for example, shows the braille (braille data) B representing character information "SHI" (hiragana character) where the first, second, fifth, and sixth points are embossing points and the third and fourth points non-embossing points.

Note that the braille B has, in addition to the six-point braille indicative of the above-described kana-character, numerals, etc., an eight-point braille (which forms one square constituted of four dots in length × two dots in width) indicative of Chinese (kanji) characters. Although the description here refers to a six-point braille B, but the present invention can also be applied to a label forming apparatus which forms an eight-point braille.

In the six-point braille B, the one square 201 is divided into six embossing points from 201*a* to 201*f* with an arrangement pattern of three dots in length×two dots in width, with a vertical embossing points being approx. 2.4 mm and a horizontal pitch approx. 2.1 mm, and a pitch between squares of approx. 3.3 mm. FIG. 4A shows a state where four embossing points 201*a*, 201*b*, 201*e*, and 201*f* are selectively embossed from among the six embossing points 201*a* to 201*f* to represent the hiragana character "SHI," and four embossing convex portions 202*a*, 202*b*, 202*e*, and 202*f* are formed on the tape T, each having a cross sectional shape with its corner rounded (see FIG. 4B) such as a cylinder, a hemisphere, a cone, and a quadrangular pyramid. Furthermore, to emboss the six-point braille B, the minimum required tape width is 12 mm long (tape T3) judging from the size (the length in the tape width direction) of the one square 201.

Further, the label forming apparatus 1 of the embodiment is provided with two other types of mutually replaceable units as the embossing unit 80: one forms small embossing convex portions 203, each having a diameter of approx. 1.4 mm, and the other large embossing convex portions 204, each having a diameter of approx. 1.8 mm. These two types of the embossing convex portions 203 and 204 may be used according to intended purpose. For example, the small embossing convex portions 203 are intended for those familiar with reading the braille B (congenital blind people), and the large embossing convex portions 204 for beginners (noncongenital blind people).

A description will be made specifically about FIGS. 1 to 3. The keyboard 3 has a characters key group 3*a* and a functions key group 3*b* arranged therein for directing various operation modes, etc. The characters key group 3*a* is used for inputting character information for ink-characters printing and braille embossing, and is constructed in a full JIS-key arrangement. The functions key group 3*b* is composed of: a print executing key (printing key) for ink-characters printing and braille embossing; a feeding start key for directing the feed start of the tape T in the braille embossing section 150; an embossing start key for manual braille embossing; a mode key for selecting a process mode for ink-characters printing and braille embossing; a layout key for setting the arrangement of an ink-characters printing region (printing arrangement area) Ep and a braille embossing region (embossing arrangement area) Eb; and a scroll key for scroll-displaying the arrangement results before execution of printing, etc. Besides, as in the case of a general word processor, etc., the functions key group 3*b* is composed of: e.g., a cancel key for canceling processes, etc.; a cursor key for moving a cursor; and an selection (enter) key for deciding among alternatives on various selection screens or for starting a new line in inputting characters.

Process modes selected by the mode key include a first, a second and a third process mode. In the first process mode, ink-characters printing and braille embossing are both performed based on inputted character information (see FIG. 8A). In the second process mode, only ink-characters printing is performed based on inputted character information (see FIG. 8B). In the third process mode, only braille embossing is performed based on inputted character information (FIG. 8C). One of the process modes is selected by the user. Note that in FIGS. 8A, 9A, etc., the alphabetical representation "AIU" is a transliteration of Japanese hiragana, and that the braille corresponds to hiragana, not to alphabets.

The display 4 is rectangular with sides of approx. 12 cm in width (in X direction) and 5 cm in length (in Y direction) where a display image of 192 dots×80 dots can be displayed. It is used when the user inputs character information through the keyboard 3 to form and edit ink-characters printing data and braille embossing data. It also displays and notifies the user of various errors and messages (command contents).

In the ink-characters printing section 120, the cartridge mounting section 6 is provided with: a head unit 20 with a head cover 20*a* including therein a printing head 7 composed of a thermal head; a platen driving shaft 25 arranged at a position opposite to that of the printing head 7; a reel driving shaft 23 for reeling up an ink ribbon R; and a positioning projection 24 for a tape reel 17. In addition, a print feeding motor 121 is embedded on the bottom of the cartridge mounting section 6 for rotating the platen driving shaft 25 and the reel driving shaft 23.

The tape cartridge C has a cartridge casing 51 in which the tape reel 17 and a ribbon reel 19 are accommodated. The tape T and the ink ribbon R have the same width in size. In the tape cartridge C, there is formed a through hole 55 to be fitted with the head cover 20*a*. Besides, at a position where the tape T and the ink ribbon R overlap each other, there is arranged a platen roller 53 which is driven to rotate by being fitted with the platen driving shaft 25. The ink ribbon R reeled out from the ribbon reel 19 is reeled up by the ribbon taking-up reel 54 in such a manner as to travel around the head cover 20*a*.

When the tape cartridge C is mounted in the cartridge mounting section 6, the head cover 20*a*, the positioning projection 24, the platen driving shaft 25, and the reel driving shaft 23 are fitted with the through hole 55, the center hole of the tape reel 17, the platen roller 53, and the center hole of the ribbon taking-up reel 54, respectively. The printing head 7 comes into contact with the platen roller 53 sandwiching the tape T and the ink ribbon R to perform ink-characters printing. Then, the tape T printed with ink characters is fed into the printing-tape ejecting port 22.

Although not specifically shown in the figure, the tape T is composed of a substrate sheet (information forming layer) whose rear face is provided with an adhesive layer and of a releasing sheet (releasing sheet layer) affixed to the substrate sheet by the adhesive layer. The substrate sheet is composed of: an image receiving layer with the enhanced fixation of ink thermally transferred from the ink ribbon; a substrate layer made of a polyethylene terephthalate (PET) film, which serves as the main body of the substrate sheet; and the adhesive layer formed of an adhesive, in a stacked manner.

The tape T has a plurality of types varying in tape width, tape color, ink color of ink characters, tape material, etc. Therefore, there are provided a plurality of holes (not shown) for discriminating the types of the tape T on the rear face of the cartridge casing 51. In addition, in the cartridge mounting section 6, there are provided a plurality of tape discriminating sensors (micro switches) 171 for detecting the types corresponding to the plurality of holes. In other words, the tape type can be determined by detecting the state of the tape discriminating sensors 171. Note that a description of the present embodiment will be made about three types of tapes, that is, tape widths of 24 mm (tape T1), 18 mm (tape T2), and 12 mm (tape T3) (see FIG. 6).

On the other hand, the rear casing 2*b* includes therein an assembly (the braille embossing section 150) for braille embossing, and the top face thereof is opened in a cross shape such that the braille embossing section 150 (more specifically, a tape traveling path 70, an embossing unit 80, and a tape feeding mechanism 60) is exposed. On the right and left sides of a notched opening section 30, there are formed an embossing-tape inserting port 31 into which the tape T is manually fed by the user and an embossing-tape ejecting port 32 from which the tape T embossed in braille is ejected, respectively.

The braille embossing section 150 has: the embossing unit 80 in which braille embossing is performed by three embossing pins 41 (see FIG. 5B); the tape feeding mechanism 60 for feeding into the embossing-tape ejecting port 32 the tape T inserted into the embossing-tape inserting port 31; and the tape traveling path 70 along which the tape T is fed. In the braille embossing section 150, the three embossing pins 41 are selectively driven by the embossing unit 80 to form braille B on the tape T which is fed along the tape traveling path 70 driven by the tape feeding mechanism 60.

Figure 5A:
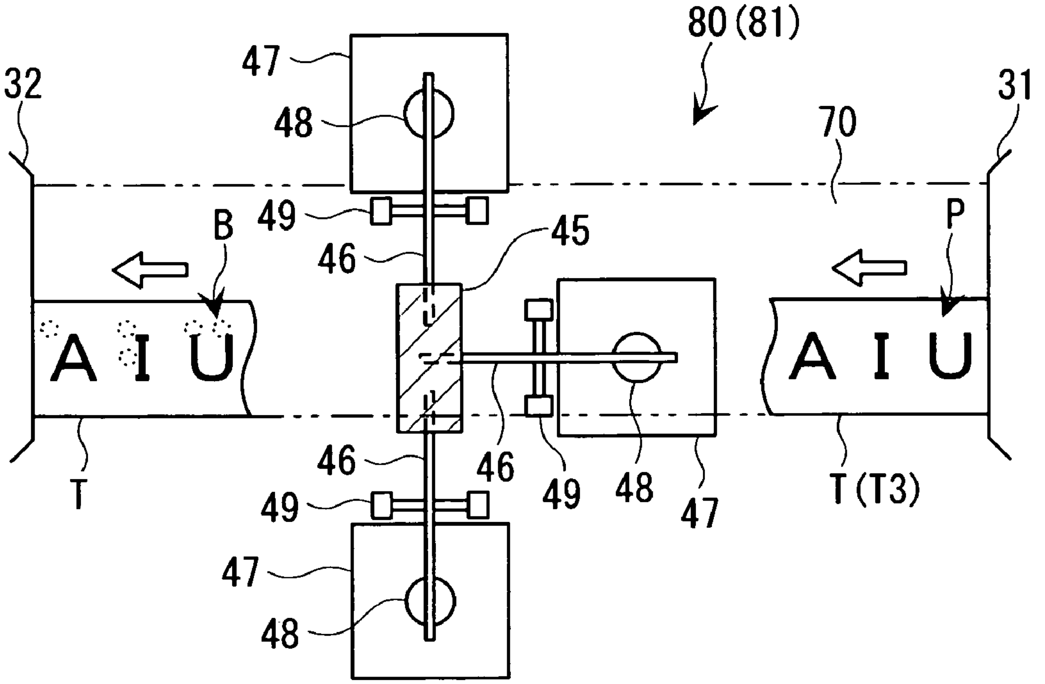
FIGS. 5A and 5B are a plan view and a cross section of an embossing unit.
Figure 5B:
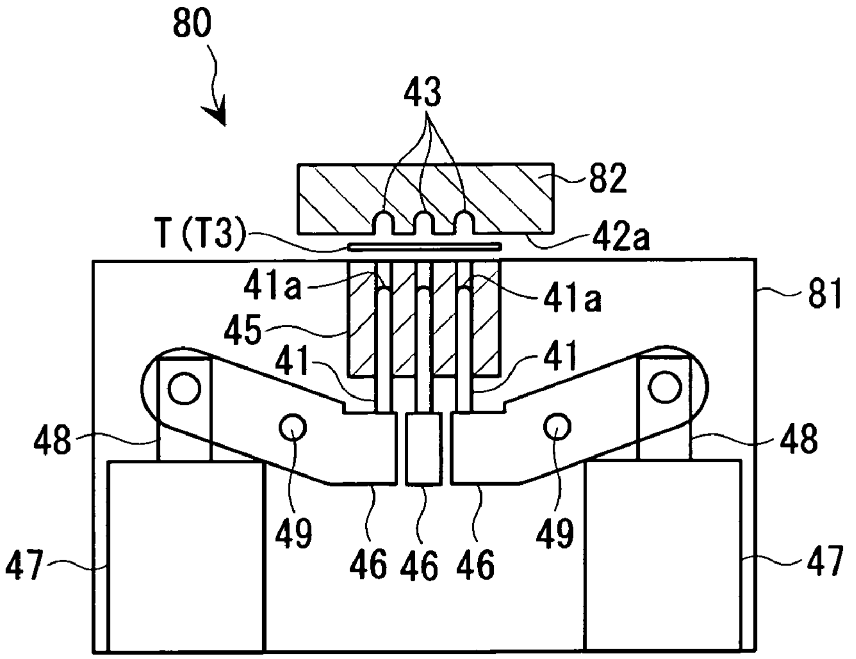

Next, the embossing unit 80 is, as shown in FIGS. 5A and 5B, composed of an embossing member (embossing head) 81 arranged on the rear face of the tape T and having the three embossing pins 41 and of an embossing receiving member 82 for receiving the embossing pins 41 via the tape T at a position opposite to the embossing member 81. As shown in FIG. 5A, the embossing unit 80 is fixed in position at the lower end in the width direction of the tape traveling path 70.

The embossing member 81 is provided with the three embossing pins 41 arranged at intervals of 2.4 mm along the tape width direction (in the vertical direction of the embossing unit in FIG. 5A). The three embossing pins 41 correspond to the vertically-arranged three embossing points 201*a* to 201*c* (or 201*d* to 201*f*) out of the six embossing points, and are held perpendicular to the tape T by guide members 45 which imparts a linear motion with solenoids 47 as a driving source. Head portions 41*a* of the embossing pins 41 are formed such that the embossing convex portions 202 are cross sectional shape with its corner rounded (see FIG. 4B) such as a cylinder, a hemisphere, a cone, and a quadrangular pyramid.

When the plungers 48 are linearly moved by the solenoids 47, the arm members 46 rotate about the supporting members 49, thereby causing the embossing pins 41 to move linearly in a direction perpendicular to the tape T. The three solenoids 47, each connected to the three arm members 46, are arranged in such a manner as to be positioned at each corner of a triangle. On the other hand, the embossing receiving member 82 has three embossing receiving concave portions 43 formed on a face 42*a* thereof opposite to the three embossing pins 41 for receiving the same. Thus, the embossing convex portions 202 are formed on the tape T by the embossing pins 41 and the embossing receiving member 82.

Figure 6:
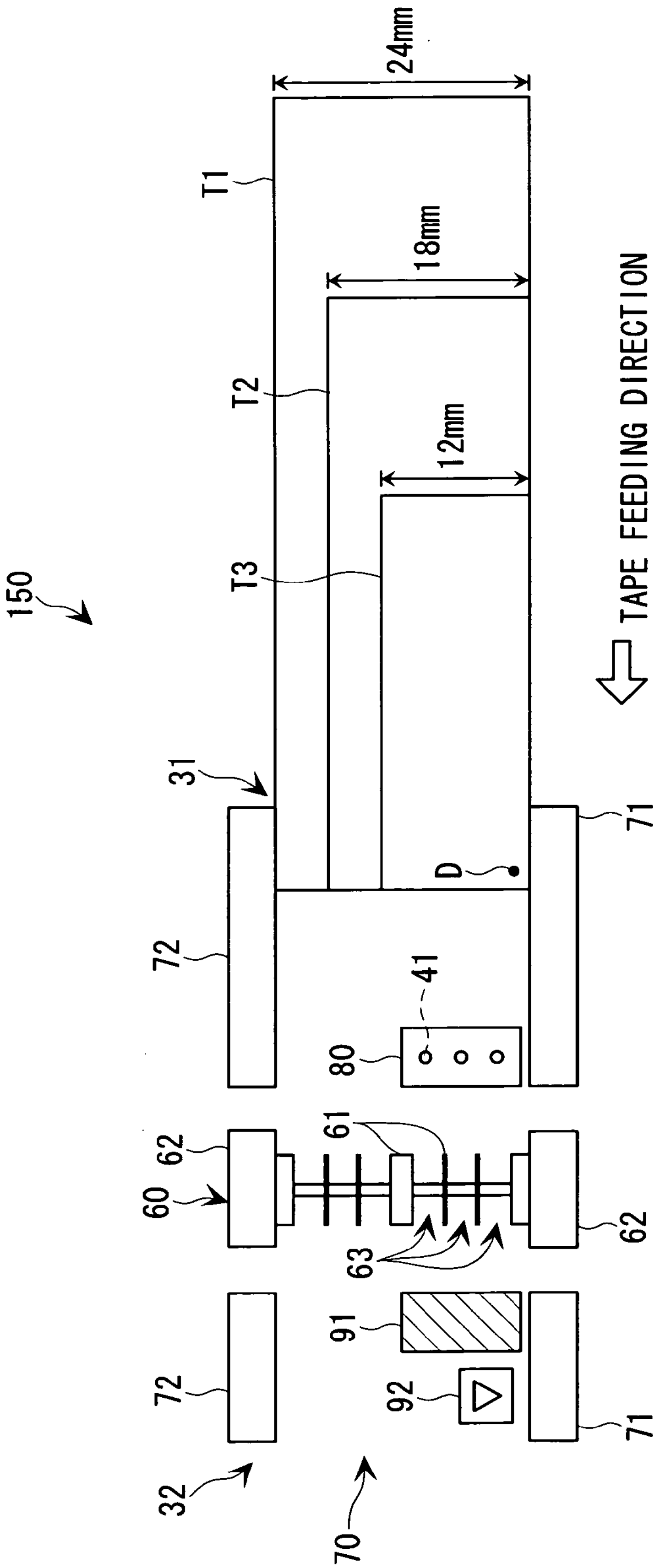
FIG. 6 is an illustration for explaining the feed of a tape in a braille embossing section.

As shown in FIG. 6, the braille embossing section 150 is further composed of: guide members 71 and 72 for guiding the feed of the tape T; a transmission front end detecting sensor 91 for detecting the front end of the tape T; and a reflective front-and-rear discriminating sensor 92 (detecting sensor) for detecting front-and-rear discriminating information D indicative of the front-and-rear of the tape T. As the front-and-rear discriminating information D, as shown in the figure, a dot "●" is printed near the front and lower ends of the tape T to indicate the inserting direction (front side) thereof.

In the embossing tape feeding port 31, the three types of tapes can be inserted in a decreasing order of tape width, i.e., tape T1 (with a width of 24 mm), tape T2 (with a width of 18 mm), and tape T3 (with a width of 12 mm). The tape T1 with the maximum tape width is guided by the upper and lower guide members 71 and 72, whereas the tapes T2 and T3, each with a smaller tape width than the tape T1, are guided only by the lower guide members 71. The user manually feeds the tape until the front end thereof reaches the tape feeding mechanism 60 (feeding rollers 61) (up to the furthest possible point of insertion). When the user presses the feeding start key on the keyboard 3, the tape feeding mechanism 60 starts the feed of the tape T3.

Figure 7:
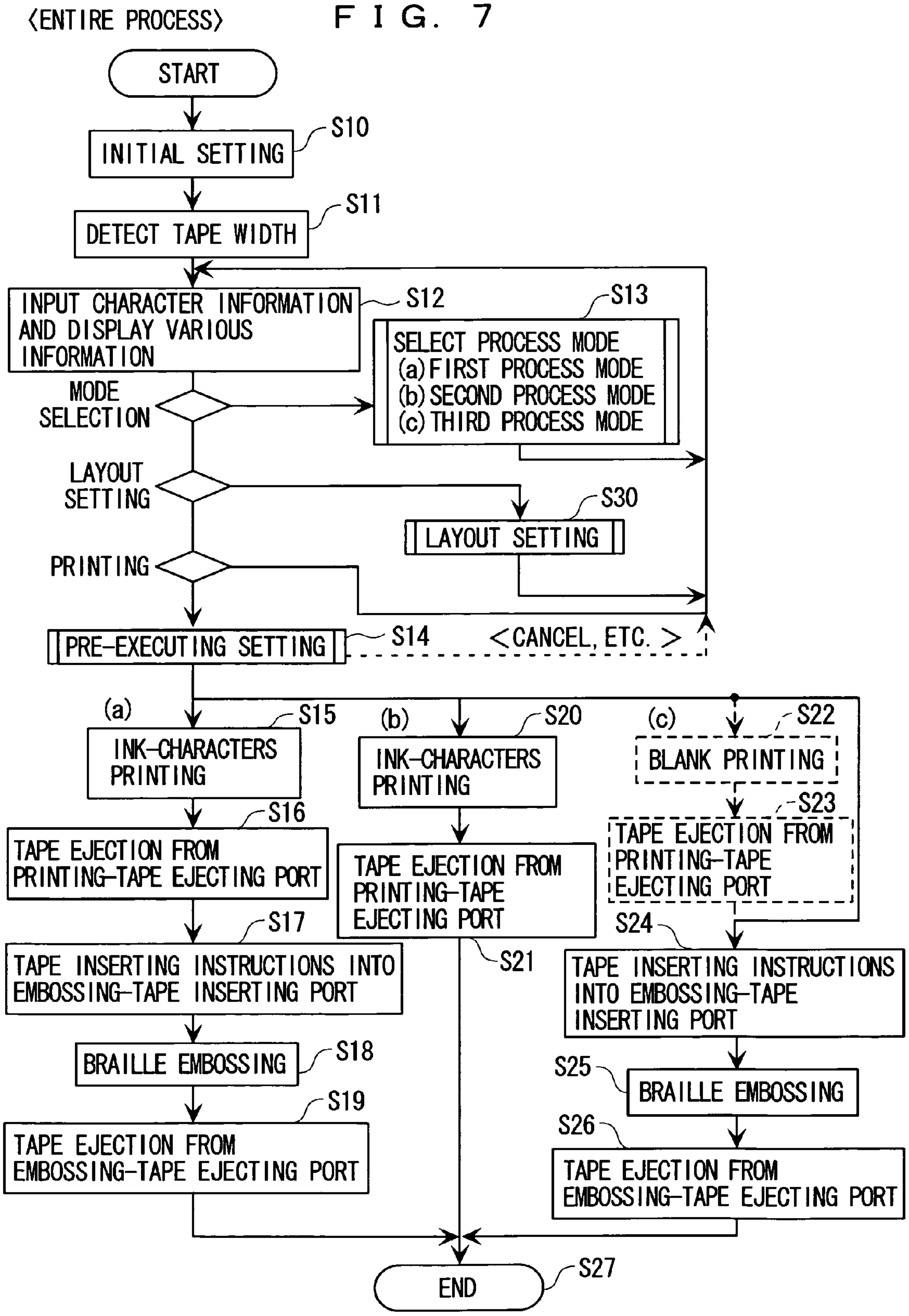
FIG. 7 is a flow chart showing an entire process of the label forming apparatus.

Next, a description will be made about the entire process of the label forming apparatus 1, with reference to FIGS. 7, 8A to 8C, and 9A to 9C. When the power key (power-on) is pressed, as shown in FIG. 7, to start a process, the respective saved control flags are restored to the initial setting so as to return to the state prior to the previous power-off state (S10), and the tape discriminating sensors 171 (see FIG. 3) detect a type of tapes (S11). Subsequently, when the user inputs character information (in the form of data) through the keyboard 3 (or external devices such as a personal computer), various information are displayed on a text editing screen. (S12).

When a mode selecting interruption results from mode selecting instructions (the mode key input) executed by the keyboard 3 (or by any external device), a process for a process mode selection starts to allow the user to select one of a first process mode (INK CHARACTERS AND BRAILLE IN COMBINATION), a second process mode (INK CHARACTERS ONLY), and a third process mode (BRAILLE ONLY) (S13).

When a layout setting interruption results from layout setting instructions (the layout key input) through the keyboard 3 (or by any external device), a process for a layout setting starts (S30). When a print interruption results from print executing instructions (the printing key input) through the keyboard 3 (or by any external device), a process for a pre-executing setting starts (S14).

In the pre-executing setting (S14), settings including a layout arrangement, etc. and final confirmation of respective settings are made at times when actual ink-characters printing and braille embossing are actually performed. Note that, when a print interruption occurs despite that there have occurred no mode selecting interruption or layout setting interruption, the mode previously used is selected as default (FIRST PROCESS MODE, BRAILLE AT LOWER SIDE, INK CHARACTERS AND BRAILLE IN PARALELL for an initial setting). When the pre-executing setting (S14) is completed, the processes for actual ink-characters printing and braille embossing start.

Figure 8A:
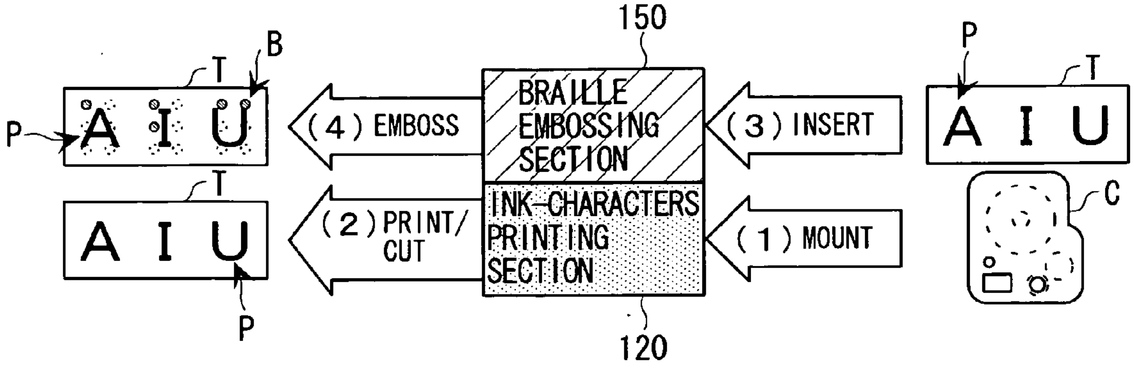
FIGS. 8A to 8C are illustrations for supplementally explaining the process modes of FIG. 7.

In other words, in the first process mode (S13:(a)) as shown in FIGS. 7 and 8A, the label forming apparatus 1 causes the ink-characters printing section 120 to print on the tape T ink characters P (ink-characters printing) (S15) and cuts it off. Then, the tape T is ejected from the printing-tape ejecting port 22 (S16). On the display 4, tape inserting instructions into the embossing-tape inserting port 31 are displayed (S17). Note that these instructions may be displayed by an indicator or an LED.

When the user (manually) inserts the tape T into the embossing-tape inserting port 31 in response to the tape inserting instructions, the braille embossing section 150 embosses braille B thereon (braille embossing) (S18). Then, the tape T embossed in braille is ejected from the embossing-tape ejecting port 32 (S19), and the process is completed (S27). In this case, the braille embossing section 150 detects front-and-rear discriminating information D. When it is determined that the tape inserting direction is wrong judging from the braille embossing direction that corresponds to the detection result and the selected layout, braille embossing will not be performed.

Figure 8B:
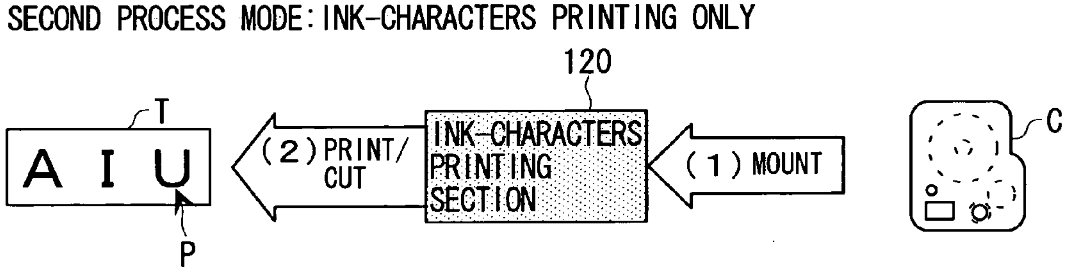
Figure 8C:
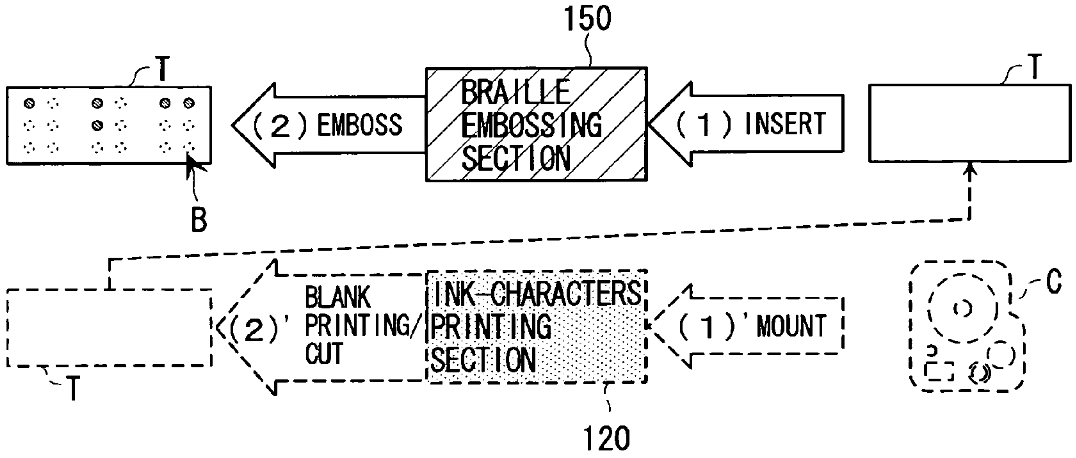

Further, in the second process mode (S13:(b)), the tape T is cut off and ejected (S21) after the ink-characters printing with the ink-characters printing section 120 (S20), and the process is completed (S27). In other words, in the second process mode, as shown in FIG. 8B, the tape T reeled out from the mounted tape cartridge C is fed into the ink-characters printing section 120 to print the ink characters P thereon. Note that, when the user selects the second process mode, printing of front-and-rear discriminating information D may be omitted.

Further, in the third process mode (S13:(c)), tape inserting instructions into the embossing-tape inserting port 31 are displayed on the display 4 (S24). In response thereto, the tape T is inserted and embossed in braille (S25). Then, it is ejected from the embossing-tape ejecting port 32 (S26), and the process is completed (S27). In other words, a strip tape T (cut into a given length) is manually fed into the braille embossing section 150 and embossed in the braille B in the third process mode as shown in FIG. 8C. Further, as in the case of the first process mode, when it is determined that the tape inserting direction is wrong judging from the braille embossing direction that corresponds to the detection result of front-and-rear discriminating information D and the selected layout, braille embossing will not be performed.

In the third process mode as well, detection of front-and-rear discriminating information D may be omitted, and the user can select whether or not to detect, the front-and-rear discriminating information D. Further, prior to the tape inserting instructions (S24) given by dotted lines as shown in FIGS. 7 and 8C, a blank printing (i.e., just feeding a tape) may be made in place of the ink-characters printing of the first process mode so as to make a strip tape T for manual insertion (S22). Then, the resulting tape T is cut off and ejected (S23). The ejected tape T may be used as a strip tape T for manual insertion. Further, the label forming apparatus 1 may be arranged such that the tape cartridge C is mounted in an upstream of the braille embossing section 150, and an elongated tape reeled out from the tape cartridge C is embossed in braille. Further, character information for use in ink-characters printing and braille embossing may be different from each other.

Next, in the layout setting (S30), the relative position between the ink-characters printing region (printing arrangement area) Ep and the braille embossing region (embossing arrangement area) Eb on the tape T (see FIGS. 9A to 9C) and the length of the respective arrangement areas (a printing arrangement area length PL, an embossing arrangement area length BL, a common arrangement area length CL) (see FIGS. 13A to 13E) are primarily set based on the results of the tape width detection (S11) and the process mode selection (S13). Besides, a character size for ink-characters printing, for example, is set in a manner similar to that used for general tape printing apparatuses and word processors (see FIG. 10A and S343 in FIG. 10B).

Especially in the first process mode (INK CHARACTERS AND BRAILLE IN COMBINATION), as shown in FIGS. 9A to 9C, when a tape width is detected to be 24 mm long (tape T1) (see FIG. 9A), the layout of the tape is selected from either the printing arrangement area Ep at the upper side and the braille arrangement area Eb at the lower side (a-1: hereinafter referred to as "BRAILLE AT LOWER SIDE"), or the printing arrangement area Ep at the lower side and the braille arrangement area Eb at the upper side (a-2: hereinafter referred to as "BRAILLE AT UPPER SIDE"). Note that ups-and-downs of the tape T herein are based on the state where front-and-rear discriminating information D is directed to the feeding direction of the tape (leftward orientation), and the front face of the tape serves as an information forming face.

Similarly, when a tape width is detected to be 18 mm long (tape T2) (see FIG. 9B), the layout of the tape is selected from either BRAILLE AT LOWER SIDE (b-1) or BRAILLE AT UPPER SIDE (b-2). In this case, however, the printing arrangement area Ep is shortened in the tape width direction in response to the tape width involved. In the cases of the tapes T1 and T2, a layout in which ink characters and braille are overlapped (hereinafter referred to as "INK CHARACTERS AND BRAILLE OVERLAPPED") can be selected, in addition to the one in which ink characters and braille are arranged in parallel (hereinafter referred to as "CHARACTERS AND BRAILLE IN PARALLEL").

When a tape width is detected to be 12 mm long (tape T3) (see FIG. 9C), which is the minimum length in which one square 201 of the braille (length in the tape width direction) can be embossed (see FIG. 4A), the only acceptable layout is the one in which the printing arrangement area Ep and the embossing arrangement area Eb are overlapped, irrespective of the arrangements of BRAILLE AT UPPER SIDE or BRAILLE AT LOWER SIDE and INK CHARACTERS AND BRAILLE IN PARALLEL or INK CHARACTERS AND BRAILLE OVERLAPPED, which may have already been selected.

Next, a description will be made specifically about a typical operation on the display 4 based on the user's inputting through the keyboard 3, particularly an operating example of the above-described layout setting (S30).

Figure 10A:
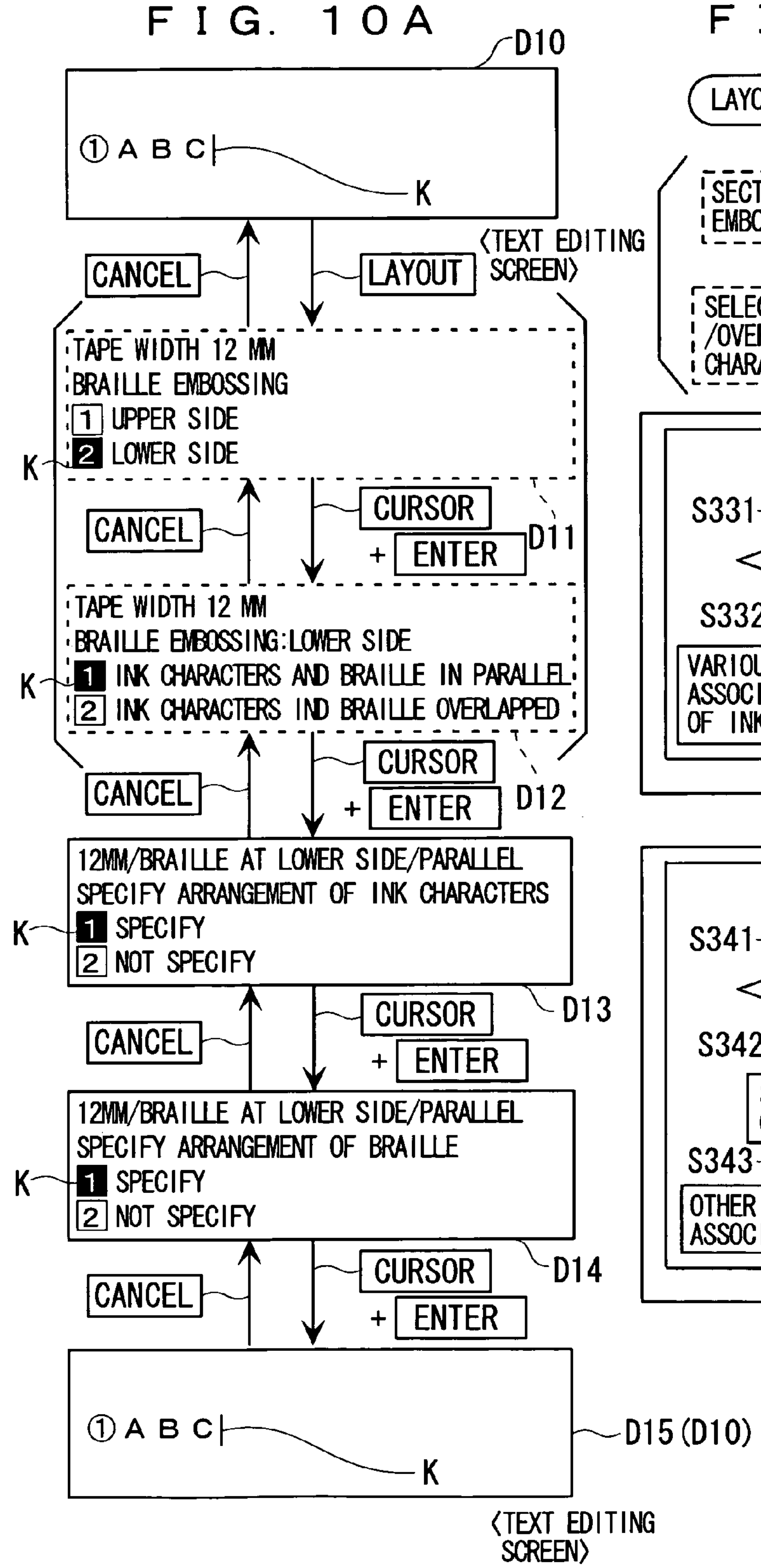
FIGS. 10A and 10B are illustrations of operations and processes when a layout setting is made.
Figure 10B:
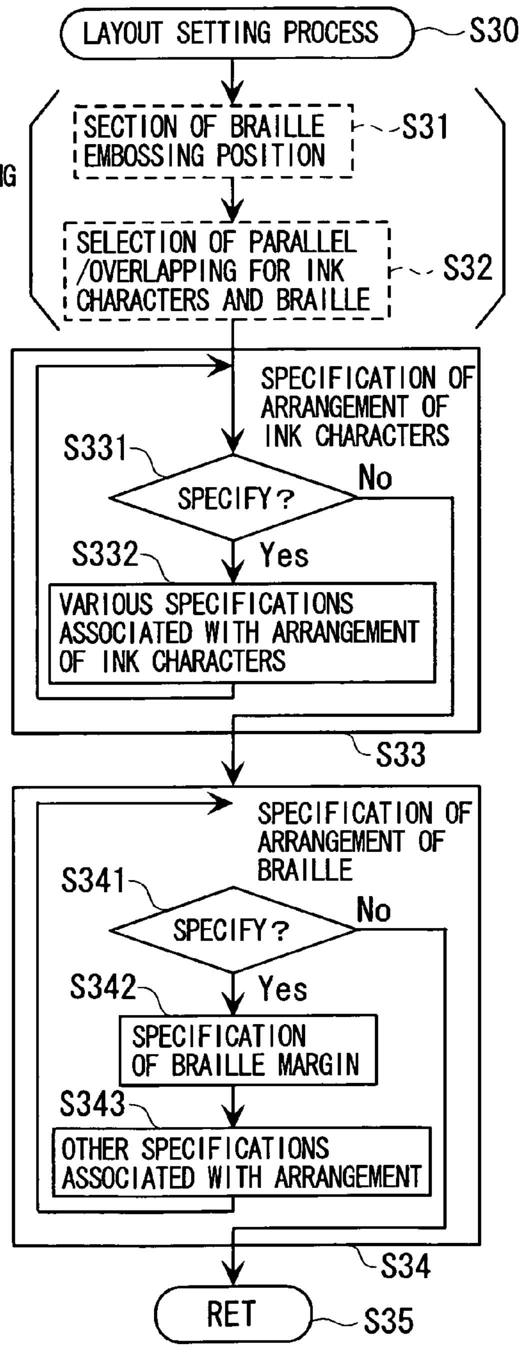

First, in the case of text editing where characters "ABC" of the first line are inputted up to a position of a cursor K, as shown in FIGS. 10A and 10B, for example, (screen D10: Note that a display screen of the display 4 is hereinafter indicated as a screen Dxx and that only the screen Dxx will be used for display and description), the screen changes to the layout setting screen (D11 to D14) for a layout setting process (S30) when the layout key is pressed by the user (layout setting interruption as shown in FIG. 7).

For the selection of a braille embossing position (S31), the screen now changes to a setting screen as a first setting screen (D11). On this screen, it is possible to select and specify, as an alternative, either of "1. UPPER SIDE" (BRAILLE AT UPPER SIDE: see (a-2) in FIG. 9A), in which braille is arranged at the upper side (as viewed from the side of ink characters) and "2. LOWER SIDE" (BRAILLE AT LOWER SIDE: see (a-1) in FIG. 9A), in which braille is arranged at the lower side (as viewed from the side of ink characters) (alternative used immediately after the previous screen change is specified and displayed by cursor operation as default: "2. LOWER SIDE" (BRAILLE AT LOWER SIDE) is to be set initially as default). On the following various selection screens as well, the alternative previously used is to be specified and displayed by cursor operation as default immediately after the screen changes as a rule. Accordingly, description thereof will be omitted and matters relating to an initial setting will be noted as required.

When the user selects "2. LOWER SIDE" by cursor (hereinafter referred to simply as "select and specify") when the enter key is pressed in the above state (D11), "BRAILLE AT LOWER SIDE" is set for braille arrangement. Then, the screen changes to a setting screen for the arrangement of ink characters and braille (selection screen for the arrangement of ink characters and braille) (D12) so as to select the arrangement of ink characters and braille from either of a parallel arrangement and an overlapping arrangement (selection of parallel/overlapping for ink characters and braille) (S32). On the selection screen, it is possible to select and specify, as an alternative, by cursor operation from either of "1. INK CHARACTERS AND BRAILLE IN PARALLEL," in which ink characters and braille are arranged in parallel, and "2. INK CHARACTERS AND BRAILLE OVERLAPPED," in which ink characters and braille are overlapped ("1. INK CHARACTERS AND BRAILLE IN PARALLEL" for an initial setting).

When the user selects and specifies "1. INK CHARACTERS AND BRAILLE IN PARALLEL," it is set as a method for the arrangement of ink characters and braille. Then, the screen changes to a specification screen for the arrangement of ink characters (D13) for various specifications on the arrangement of ink-characters printing (S33). On this specification screen, displayed as an alternative are "1. SPECIFY" in which various specifications associated with the arrangement of ink-characters printing are made, and "NOT SPECIFY" in which such specifications are not made (settings are not changed) ("NOT SPECIFY" for an initial setting). When the user selects and specifies "1. SPECIFY" (S331: Yes), it is set for the arrangement of ink characters (settings are changed). Then, various specifications associated with the arrangement of ink characters (of which the detailed description is omitted) are made available (S332). Upon completion of the specifications, the screen returns to the initial specification screen for the arrangement of ink-characters (D13).

On the other hand, when the user selects and specifies "2. NOT SPECIFY" on the specification screen for the arrangement of ink characters (D13) (S331: No), it is set for the arrangement of ink characters, and then the screen changes to a specification screen for the arrangement of braille (D14) for various specifications on the arrangement of braille embossing (S34).

On the specification screen for the arrangement of braille embossing as well (D14), in the same manner as the specification screen for the arrangement of ink characters (D13), displayed as an alternative are "1. SPECIFY" in which various specifications associated with the arrangement of braille embossing are made, and "2. NOT SPECIFY" in which such specifications are not made (settings are not changed) ("2. NOT SPECIFY" for an initial setting). When the user selects and specifies "2. NOT SPECIFY" (S341: No), it is set for the arrangement of braille, and the screen returns to the text editing screen (on which character information is inputted) (D15 which is the same as D10 and corresponds to S12 in FIG. 7).

Note that the label forming apparatus 1 has features of setting front-and-rear margins for specifying the arrangement of braille. Accordingly, a tape with a width of 12 mm, a length whose effect is easy to understand (that is, easy to show and describe), will be given a detailed account below. In the case of the tape T3 with a width of 12 mm as described above (see FIG. 9C), only the layout, in which the printing arrangement area Ep and the embossing arrangement area Eb overlap each other, is allowed irrespective of the arrangements of the BRAILLE AT UPPER SIDE or BRAILLE AT LOWER SIDE and INK CHARACTERS AND BRAILLE IN PARALLEL or INK CHARACTERS AND BRAILLE OVERLAPPED, which may have already been selected and specified. Thus, when the tape is detected to be 12 mm long, the selection of a braille embossing position (S31, D11) and the selection of parallel/overlapping for ink characters and braille (S32, D12) may be omitted as described in FIGS. 10A and 10B, and are therefore shown by the dotted line.

Figure 11:
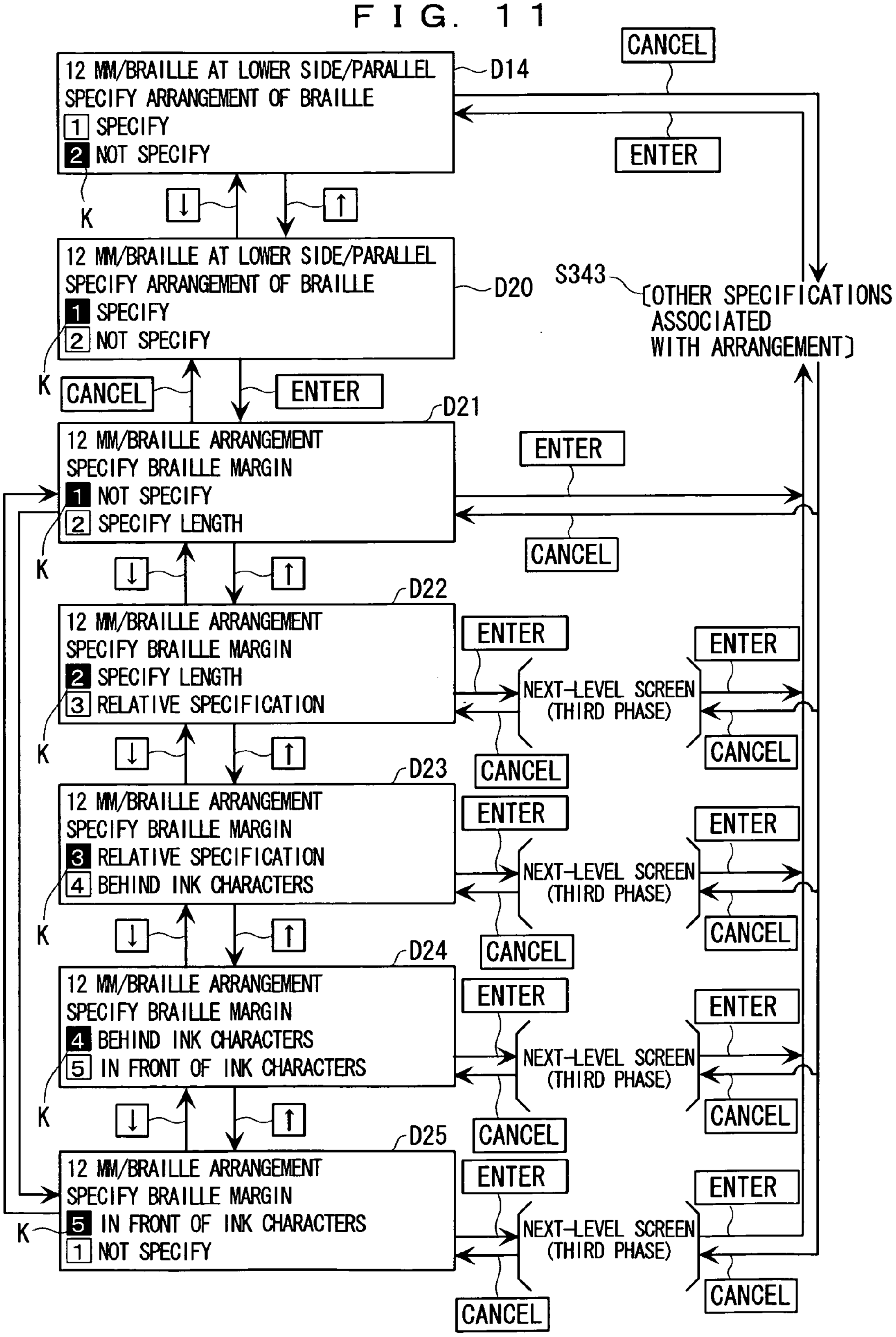
FIG. 11 is an illustration for specifying braille margins for the specification of a braille arrangement.

As shown in FIGS. 10B, 11, and 12, when the user selects and specifies "1. SPECIFY" (D20, S341: Yes) in the foregoing specification on the arrangement of braille (S34, D14 common to FIGS. 10A and 11), it is set for the arrangement of braille (settings are changed). Then, the screen changes to a specification screen for braille margins (D21) for specification thereof (S342). Note that the specification of braille margins (S342) is first made for the sake of convenience herein. However, during the specification process on the arrangement of braille (S34), the specification sequence may be altered between the specification of braille margins and part or the whole of other specifications associated with the arrangement (S343) such as settings for size inside a square and distance ranging from one square to another square, which is different from a de facto standard.

On the specification screen for braille margins (D21 to D25), displayed as an alternative are "1. NOT SPECIFY" in which specification of braille margins is not made (settings are not changed), "2. SPECIFY LENGTH," "3. RELATIVE SPECIFICATION," "4. BEHIND INK CHARACTERS," and "5. IN FRONT OF INK CHARACTERS" ("1. NOT SPECIFY" for an initial setting). When the user selects and specifies "1. NOT SPECIFY," the screen changes to other specifications associated with the arrangement (S343). Upon completion of the specifications, the screen returns to the initial specification screen for braille margins (D14).

A description will now be made about an example of a label to be actually formed. In the layout setting (S30 in FIG. 7), let it be assumed that the user presses the printing key such that a print interruption occurs in a state where no specification is particularly made (settings are not changed) and the screen returns to the initial screen, i.e., in a state where the characters "ABC" are inputted (D15 in FIG. 10A: S12 in FIG. 7). When the user selects and specifies the second process mode (INK CHARACTERS ONLY), ink characters printing is performed (S20) in accordance with, for example, an ink-characters image (ink-characters printing data) Gp0 of FIG. 13A, and the tape T is ejected from the printing-tape ejecting port 22 (S21). The process is then completed (S27). In this case, only ink characters printing is performed to form a label Lp0 reflecting the result of ink-characters printing.

When the user selects and specifies the third process mode (BRAILLE ONLY), the processes ranging from the blank printing to the ejection of the tape T are made as required (S22 to S23), and the tape inserting instructions are displayed (S24). When the tape T is manually inserted by the user, braille embossing is performed (S25 to S26) in accordance with a braille image (braille embossing data) Gb0 of FIG. 13B. The process is then completed (S27). In this case, only braille embossing is performed to form a label Lb0 reflecting the result of braille embossing.

Figure 13A:
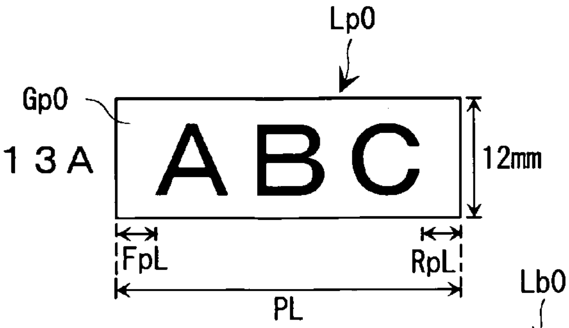
FIGS. 13A to 13E are illustrations of exemplified ink-characters images, braille images, and labels, which are formed by various margin settings.
Figure 13B:
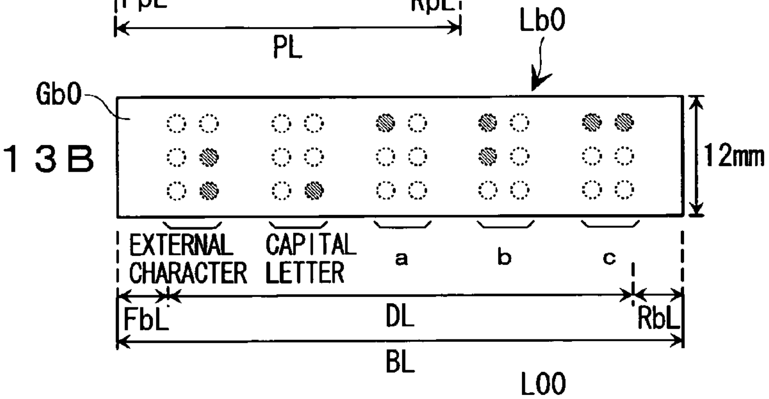

In FIG. 13A, the length of a front margin (hereinafter referred to simply as a "front margin") FpL (e.g., FpL=4 mm=0.4 cm) and the length of a rear margin (hereinafter referred to simply as a "rear margin") RpL (e.g., RpL=0.4 cm) of the ink-characters image Gp0 are set to the default of the previous setting (or an initial setting) only for ink characters. In FIG. 13B, a front margin FbL (e.g., FbL=0.5 cm) and a rear margin RbL (e.g., RbL=0.5 cm) of the braille image Gb0 are set to the default of the previous setting (or an initial setting) only for braille. Namely, each of the margins is set to a value determined based on the case "NOT SPECIFY" (settings are not changed). Further, it is assumed that the length consisting of the front margin FbL and the rear margin RbL added to an actual braille embossing length DL is defined as an embossing arrangement length BL. Furthermore, it is assumed that the first process mode (INK CHARACTERS AND BRAILLE IN COMBINATION) has been selected for the explanation of the relative position between ink characters and braille.

Figure 13C:
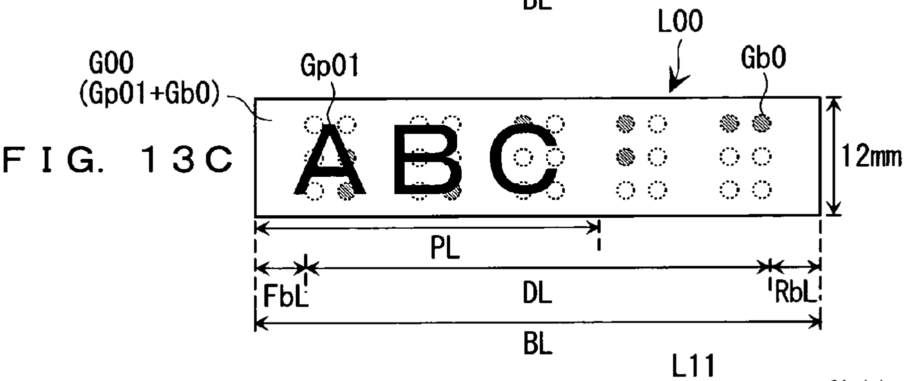
Figure 13D:
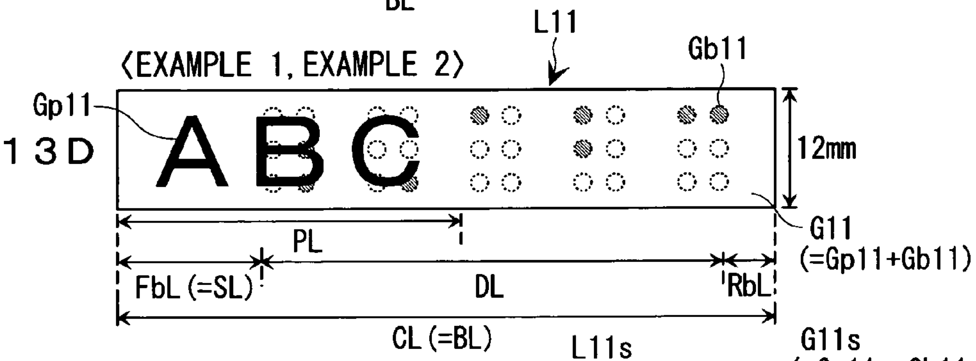

In the case of "NOT SPECIFY" (settings are not changed), the ink-characters image Gp0 of FIG. 13A is extended up to a common arrangement area length CL (in this case, CL=BL: the longer one) resulting from the length adjustment. After ink-characters printing is performed in accordance with the ink-characters image Gp01 (S15 to S16 in FIG. 7), the tape inserting instructions are displayed (S17). When the tape T is manually inserted by the user, braille embossing for the braille image Gb0 of FIG. 13B is performed (S18 to S19), and the process is completed (S27). As a result, a label L00 having an appearance (image) G00 as shown in FIG. 13C can be formed.

Next, when the user selects and specifies an alternative other than "1. NOT SPECIFY" (D22 to D25) on the specification screen for braille margins (D21 to D25) of FIG. 11, the screen changes to those of next level (that is, the third phase with D20, etc. assumed as the first phase and D22 to D25 as the second phase). When specifications and settings are made on the next-level screens of the respective phases, the screen changes to other specifications associated with the arrangement (S343). After completion of this operation, the screen returns to the initial screen (D14).

For example, when the user selects and specifies "2. SPECIFY LENGTH" (D22), on the next-level screen (the third phase), alternatives (see FIG. 12) of the length ranging from 0.5 cm to 5.0 cm in increments of 0.5 cm are displayed, which makes it possible to select one of the alternatives. When the user selects and specifies "1.5 cm," it (specified length SL=1.5 cm) is set for "2. SPECIFY LENGTH," and the setting therefor is completed. Then, the screen changes to other specifications associated with the arrangement (S343). After completion of this operation, the screen returns to the initial screen (D14).

In this case, when the screen returns to the text editing screen on which character information is inputted without any change in other settings (D15 in FIG. 10A: S12 in FIG. 7) and the printing key is pressed by the user (causing a print interruption to occur), as shown in the Example 1 of FIG. 13D, a braille image Gb11 is formed in a common arrangement area length CL (=embossing arrangement area length BL), of which the front margin FbL (=SL=1.5 cm) is extended, and an ink-characters image Gp11 is formed in the common arrangement area length CL thus extended. Ink-characters printing and braille embossing are performed based on the ink-characters image Gp11 and the braille image Gb11 (S15 to S19 and S27 in FIG. 7), to thereby form a label L11 with the ink characters and the braille as shown in an appearance image G11 of FIG. 13D.

Further, when the user selects and specifies "3. RELATIVE SPECIFICATION" (D23 in FIG. 11), for example, on the next-level screen (the third phase) are displayed alternatives (see FIG. 12) such as "MINIMUM," "SMALL," "NORMAL," "AUTOMATIC," and "LARGE." When the user selects and specifies "NORMAL" and it (relative length) corresponds to "1.5 cm" over the total length, the length SL is set to 1.5 cm, and the setting of "RELATIVE SPECIFICATION" is completed. Then, the screen changes to other specifications associated with the arrangement (S343). After completion of this operation, the screen returns to the initial screen (D14).

In the same way as "2. SPECIFY LENGTH", when the screen returns to the text editing screen on which character information is inputted without any change in other settings (S12 in FIG. 7) and the printing key is pressed by the user, ink-characters printing and braille embossing are performed based on the ink-characters image Gp11 and the braille image Gb11 of FIG. 13D (S15 to S19 and S27 in FIG. 7), to thereby form the label L11 with the ink characters and the braille as shown in an appearance image G11 of FIG. 13D (Example 2).

Figure 13E:
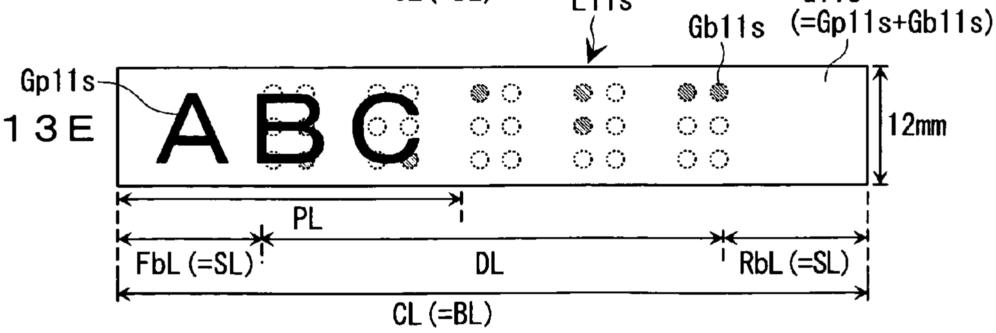

In the Examples 1 and 2, only the front margin FbL is changed and the rear margin RbL is set to the default (e.g., RbL=0.5 cm). However, under the specification of the front margin FbL=rear margin RbL, for example, a label L11*s* having an appearance image G11*s* is formed based on an ink-characters image Gp11*s* and a braille image Gb11*s* in a common arrangement area length CL as shown in FIG. 13E. Further, when "CENTER ALIGNMENT" (centering) is previously set, the label L11*s* is formed in the same manner as the above. When the common arrangement area length CL is previously specified by the so-called fixed length specification and "LEFT JUSTIFICATION" is set, the remaining length is set to the rear margin RbL according to the above specification.

Figure 14A:
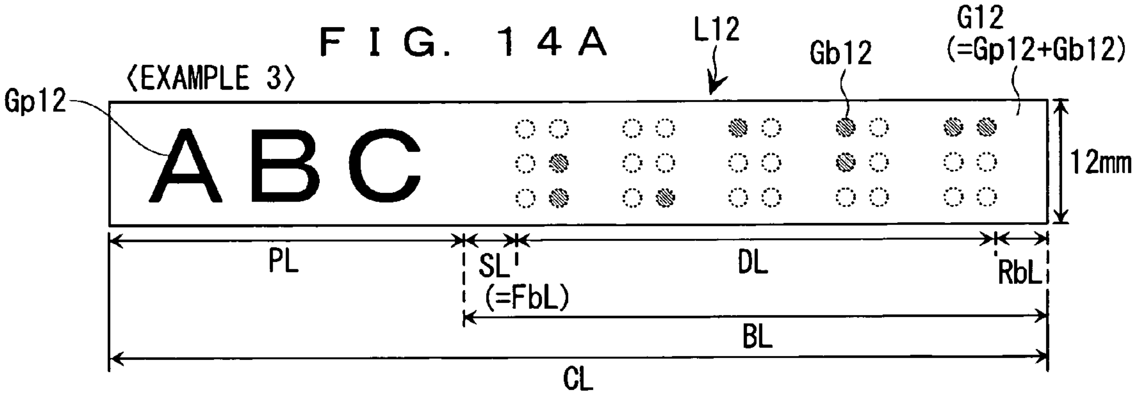
FIGS. 14A to 14D are illustrations for specifying a relative positional relation between ink characters and braille in a manner similar to those of FIGS. 13A to 13E.
Figure 14B:
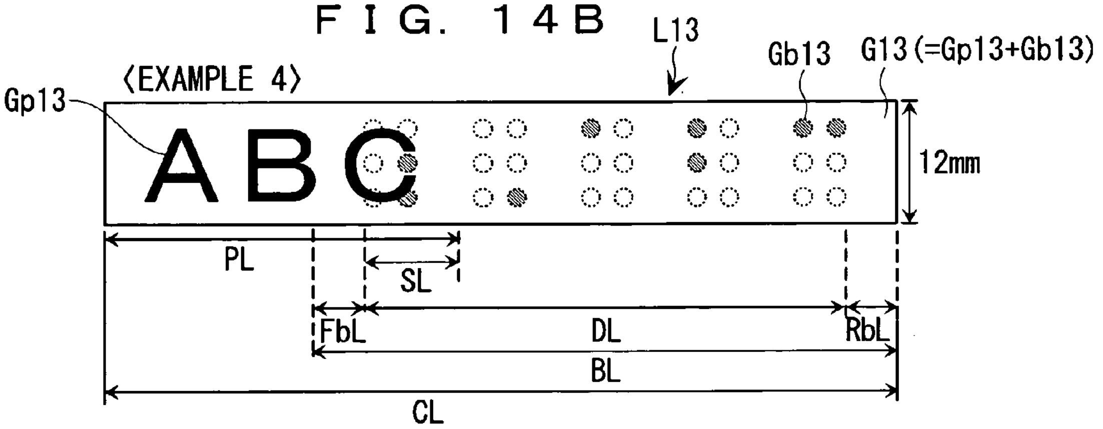
Figure 14C:
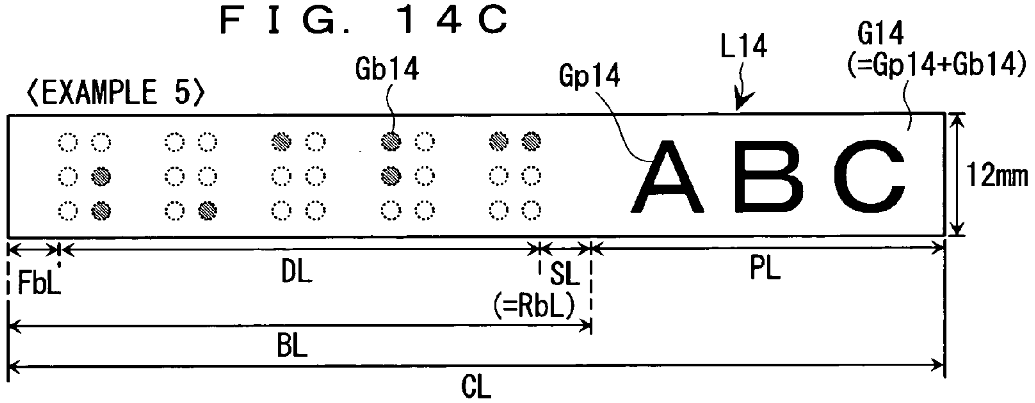

However, as shown in FIGS. 14A and 14C, for example, in order to achieve an arrangement (layout) in consideration of a relative positional relation between ink characters and braille using the margin setting based on the Example 1 (SPECIFY LENGTH) and the Example 2 (RELATIVE SPECIFICATION), it is necessary to minutely examine (calculate) a length to be set and perform some printing or embossing for tests, which involves an complicated process.

Thus, the label forming apparatus 1 has alternatives capable of easily establishing a relative positional relation between ink characters and braille, which will be described below. In other words, "4. BEHIND INK CHARACTERS" and "5. IN FRONT OF INK CHARACTERS" are provided as an alternative for setting the relative positional relation.

When the user now selects and specifies "4. BEHIND INK CHARACTERS" (D24 in FIG. 11), on the next-level screen (the third phase), alternatives (see FIG. 12) of the length ranging from −5.0 cm to +5.0 cm in increments of 0.5 cm are displayed, which makes it possible to select one of the alternatives. When the user selects and specifies "+0.5 cm" same as the default value, it (specified length (hereinafter referred to as interval) SL=+0.5 cm) is set for the setting of "4. BEHIND INK CHARACTERS," and the setting therefor is completed. Then, the screen changes to other specifications associated with the arrangement (S343). After completion of this operation, the screen returns to the initial screen (D14).

In this case, when the screen returns to the text editing screen on which character information is inputted without any change in other settings (D15 in FIG. 10A: S12 in FIG. 7) and the printing key is pressed by the user (causing a print interruption to occur), as shown in the Example 3 of FIG. 14A, a setting length SL as a front margin FbL set in front of braille is defined (FbL=SL) to arrange braille behind ink characters "ABC" just like the phase "BEHIND INK CHARACTERS." In addition, a margin for a printing arrangement area length PL is provided in front of the setting length SL (a front margin PL is added), to thereby define a common arrangement area length CL (=PL+BL=PL+SL+DL+RbL).

Subsequently, a braille image Gb12, of which the front margin is extended and an ink-characters image Gp12, of which the rear margin is extended are formed in such a way that their respective total lengths equal a common arrangement area length CL. Ink-characters printing and braille embossing are performed based on the ink-characters image Gp12 and the braille image Gb12 (S15 to S19 and S27 in FIG. 7), to thereby form a label L12 with the ink characters and the braille as shown in an appearance image G12 of FIG. 14A.

Note that the third phase of the alternative "4. BEHIND INK CHARACTERS" characteristically includes negative values of the length ranging from −5.0 cm to −0.5 cm in increments of 0.5 cm (see FIG. 12).

When the user now selects and specifies the negative value of "−1.0 cm," it (specified length SL=−1.0 cm) is set for "4. BEHIND INK CHARACTERS," and the setting therefor is completed. Then, the screen changes to other specifications associated with the arrangement (S343). After completion of this operation, the screen returns to the initial screen (D14). However, when the screen returns to the text editing screen on which character information is inputted without any change in other settings and the printing key is pressed by the user, as shown in the Example 4 of FIG. 14B, a layout is set such that a braille image Gb13 is placed "BEHIND INK CHARACTERS" on the whole while an interval is negative. In other words, an actual embossing area length DL and a printing arrangement area length PL partially overlap each other. As a result, a layout is set such that ink characters and braille are partially overlapped with each other (S30 in FIG. 7).

In this case, a margin is set in front of the actual embossing area length DL by an amount formed by subtracting a setting length SL from the printing arrangement area length PL (a front margin formed by subtracting SL from PL is added), so as to define a common arrangement area length CL (=PL−SL−FbL+BL=PL−SL+DL+RbL). Subsequently, a braille image Gb13, of which the front margin is extended and an ink-characters image Gp13, of which the rear margin is extended are formed in such a way that their respective total lengths equal the common arrangement area length CL. Ink-characters printing and braille embossing are performed based on the braille image Gb13 and the ink-characters image Gp13 (S15 to S19 and S27 in FIG. 7), to thereby form a label L13 with the ink characters and the braille as shown in an appearance image G13 of FIG. 14B.

When the user now selects and specifies "5. IN FRONT OF INK CHARACTERS" (D25 in FIG. 11), on the screen for the next-level screen (the third phase), alternatives (see FIG. 12) of the length ranging from −5.0 cm to +5.0 cm in increments of 0.5 cm as in the case of "BEHIND INK CHARACTERS" are displayed, which makes it possible to select one of the alternatives. When the user selects and specifies "+0.5 cm", it (specified length SL=+0.5 cm) is set for the setting of "5. IN FRONT OF INK CHARACTERS," and the setting therefor is completed. Then, the screen changes to other specifications associated with the arrangement (S343). After completion of this operation, the screen returns to the initial screen (D14).

In this case, when the screen returns to the text editing screen on which character information is inputted without any change in other settings (D15 in FIG. 10A: S12 in FIG. 7) and the printing key is pressed by the user (causing a print interruption to occur), as shown in the Example 5 of FIG. 14C, a setting length SL as a rear margin RbL set behind braille is defined (RbL=SL) to arrange braille in front of ink characters "ABC" just like the phase "IN FRONT OF INK CHARACTERS." In addition, a margin for a printing arrangement area length PL is provided behind the setting length SL (a front margin PL is added), to thereby define a common arrangement area length CL (=BL+PL=FbL+DL+SL+PL).

Subsequently, a braille image Gb14, of which the rear margin is extended and an ink-characters image Gp14, of which the front margin is extended are formed in such a way that their respective total lengths equal the common arrangement area length CL. Ink-characters printing and braille embossing are performed based on the ink-characters image Gp14 and the braille image Gb14 (S15 to S19 and S27 in FIG. 7), to thereby form a label L14 with the ink characters and the braille as shown in an appearance image G14 of FIG. 14C.

As in the case of "4. BEHIND INK CHARACTERS," the third phase of the alternative "5. IN FRONT OF INK CHARACTERS" characteristically includes negative values of the length ranging from −5.0 cm to −0.5 cm in increments of 0.5 cm (see FIG. 12).

Figure 14D:
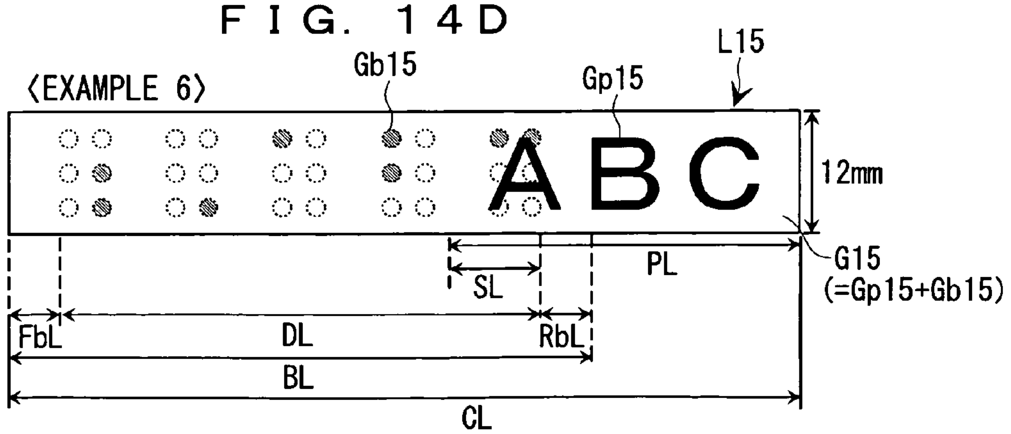

When the user now selects and specifies the negative value of "−1.0 cm," it (specified length SL=−1.0 cm) is set for "5. IN FRONT OF INK CHARACTERS," and the setting therefor is completed. Then, the screen changes to other specifications associated with the arrangement (S343). After completion of this operation, the screen returns to the initial screen (D14). However, when the screen returns to the text editing screen on which character information is inputted without any change in other settings and the printing key is pressed by the user, a layout is set as shown in the Example 6 of FIG. 14D, "in front of ink characters" as viewed on the whole, with an actual embossing length DL partially overlapping with a printing arrangement area length PL because of a negative interval (S30 in FIG. 7).

In this case, a margin is set behind the actual embossing area length DL by an amount formed by subtracting a setting length SL from the printing arrangement area length PL (a rear margin formed by subtracting SL from PL is added), so as to define a common arrangement area length CL (=BL−RbL−SL+PL=FbL+DL−SL+PL). Subsequently, a braille image Gb15, of which the rear margin is extended and an ink-characters image Gp15, of which the front margin is extended, are formed in such a way that their respective total lengths equal the common arrangement area length CL. Ink-characters printing and braille embossing are performed based on the braille image Gb15 and the ink-characters image Gp15 (S15 to S19 and S27 in FIG. 7), to thereby form a label L15 with the ink characters and the braille as shown in an appearance image G15 of FIG. 14D.

As described in detail above, according to the label forming apparatus 1 of the present embodiment, there are provided alternatives (candidate alternatives) such as "BEHIND INK CHARACTERS" and "IN FRONT OF INK CHARACTERS" (having relative positional information) indicating a relative positional relation between ink characters and braille which are printed and embossed on the same tape T, for specifying a braille margin. Accordingly, only selection and specification of the alternatives enable the arrangement of ink characters and braille with ease. In other words, a desired relative positional relation between ink characters and braille can easily be established by a margin setting.

Further, when the candidate alternatives indicating a relative positional relation are selected by the user, aside from the front-and-rear relation, alternatives for an interval in the front-and-rear direction can be selected and specified on the next-level screen (the third phase). Accordingly, ink characters and braille having a desired front-and-rear relation and interval can easily be arranged. Also, a relative positional relation based on the arrangement can easily be established by a margin setting. Moreover, since an interval with a negative value can be selected and specified, a relative positional relation, in which ink characters and braille overlap each other by a distance of the negative value, can easily be established.

In the above embodiment, it is assumed that either the front or rear end of the printing arrangement area length PL is a standard of the interval. Alternatively, the front or rear end of an actual printing area excluding a front margin FpL and a rear margin RpL may also be used as the standard. In the former, either the front or rear margin already set can be used without any change because it is easier to see ink characters when ink-characters printing is solely performed. On the other hand, the latter case is preferable regardless of the existing setting when a new setting is made in consideration only of a positional relation between ink characters (actual printing area) and braille (actual embossing area) actually appearing on a face. Therefore, either of the above may be used.

Further, in the above embodiment, the front and rear margins are both set in a series of margin settings. Alternatively, the front and rear margins may separately be set. In such a case, if the alternatives of "SPECIFY LENGTH," "RELATIVE SPECIFICATION," and "BEHIND INK CHARACTERS" as shown in FIG. 12 are capable of setting a front margin, and the alternatives of "SPECIFY LENGTH," "RELATIVE SPECIFICATION," and "IN FRONT OF INK CHARACTERS" as shown in FIG. 12 are capable of setting a rear margin, the setting either of the front margin and the rear margin can be made.

Further, in the above embodiment, the tape T3 with a width of 12 mm is used as an example for a margin setting for braille. Alternatively, the tape T1 with a width of 18 mm and the tape T2 with a width of 18 mm may also be used for a margin setting. With these tapes, the alternatives of "UPPER SIDE" and "LOWER SIDE" for the arrangement of braille as well as those of "PARALELL" or "OVERLAPPED" for the arrangement of ink characters and braille may be selected. In each of these cases, the margin setting for braille can also be applied in the same way. In other words, the margin setting for braille can be applied not only to one type of relative positional information aimed at a front-and-rear relation where ink characters and braille are aligned with each other, but also to another type of relative positional information aimed at a vertical or an oblique relation where ink characters and braille are arranged over a plurality of lines or partially overlapped with each other in a manner shifting to the vertical direction. It is sufficient enough in these cases if only the alternatives for front and rear margins indicate the front-and-rear relation in terms of the front-and-rear direction.

Differently from the above embodiment, a label may be configured such that top and bottom margins are set in these cases. If a candidate alternative indicating top and bottom margin is provided as a candidate alternative indicating a relative positional relation (and an interval) in the vertical direction, it is possible to easily establish a desired relative positional relation between ink characters and braille just by selecting and specifying one of the candidate alternatives provided when he/she sets one of the top margin, bottom margin, or the top-and-bottom margins. Note in this case that it is also possible to select a relative positional relation and an interval thereof not only in the top-and-bottom or the front-and-rear direction but also in the oblique direction.

The functions or various processing methods (including character-information processing methods) of the character-information processing apparatus used in the above embodiment can be applied as programs processed not only by the label forming apparatus 1 but also by various apparatuses capable of processing the same. The functions or various processing methods can be applied to storage media such as a CD, an MD, and a DVD for storing programs of this type. The programs are stored therein or read out therefrom to be implemented. As a result, a desired relative positional relation between ink characters and braille can easily be established by a margin setting. As a matter of course, modifications may be made without departing from the spirit and scope hereof.

What is claimed is:

1. A character-information processing method, comprising:

storing a candidate alternative having relative positional information including at least a front-and-rear relation of ink-characters and braille, which are printed and embossed, respectively, on the same sheet, as one of those alternatives for setting margins capable of being set as margins of the braille, and arranging, when the candidate alternative is selected from among those alternatives for margins, the ink characters and the braille based on the relative positional information.

2. The character-information processing method according to claim 1, wherein the relative positional information includes, in addition to information on the front-and-rear relation, information on an interval between the ink characters and the braille in the front-and-rear direction thereof.

3. The character-information processing method according to claim 2, wherein a plurality of types of candidate alternatives are specified, the interval is specified as a standard of zero in a state where the ink characters and the braille are sequentially arranged in the front-and-rear direction, and the plurality of types of candidate alternatives include those indicating negative values of the interval.

4. The character-information processing method according to claim 2, wherein the front or rear end of the ink characters including the margins set for printing the ink characters is a standard of the interval.

5. A program capable of implementing the character-information processing method as defined in any one of claims 1 to 4.

6. A storage medium storing the program as defined in claim 5 in such a way that it is readable by a device capable of processing the program.

7. A character-information processing apparatus for printing ink characters and embossing braille on the same sheet, comprising:

a storage means for storing a candidate alternative having relative positional information including at least the front-and-rear relation of the ink characters and the braille on the sheet as one of those alternatives for setting margins capable of being set as margins of the braille;

a selection means for selecting the candidate alternative from among those alternatives for setting margins as a margin to be set; and an arrangement means for arranging the ink characters and the braille based on the relative positional information when the candidate alternative is selected.

* * * * *